United States Patent
Ruff et al.

[19]

[11] Patent Number: 6,088,778
[45] Date of Patent: *Jul. 11, 2000

[54] METHOD FOR MANIPULATING DISK PARTITIONS

[75] Inventors: Eric J. Ruff; Robert S Raymond, both of Orem, Utah

[73] Assignee: PowerQuest Corporation, Orem, Utah

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/002,970

[22] Filed: Jan. 5, 1998

Related U.S. Application Data

[63] Continuation of application No. 08/554,828, Nov. 7, 1995, which is a continuation-in-part of application No. 08/393,805, Feb. 23, 1995, Pat. No. 5,675,769.

[51] Int. Cl.[7] ..................................... G06F 12/02
[52] U.S. Cl. .......................... 711/173; 711/112; 711/165; 711/170
[58] Field of Search ........................... 711/111, 112, 153, 711/165, 170, 173

[56] References Cited

U.S. PATENT DOCUMENTS

| | | | |
|---|---|---|---|
| 4,722,048 | 1/1988 | Hirsch et al. | 364/200 |
| 4,819,159 | 4/1989 | Shipley et al. | 364/200 |
| 4,982,324 | 1/1991 | McConaughy et al. | 364/200 |

(List continued on next page.)

OTHER PUBLICATIONS

Byers, T.J., Inside the IBM PC AT, (McGraw–Hill 1985), pp. 97–98.

"NTFS System Files", Microsoft Corporation (1995), PSS ID No. Q103657, Mar. 7, 1995.

Norton Utilities® for Windows® 95 User's Guide, Symantec Corporation (1995), pp. 2–31, 2–32.

"Additional Information About Chkdsk", Windows NT Workstation, Microsoft Corporation (1997), no later than Jul. 1, 1997.

Central Point PC Tools for Windows, Central Point Software, Inc.® (1993), pp. 553–555.

M. Russinovich, "Inside Windows NT Disk Defragmentation", Mar. 6, 1997.

OS/2 2.0 Technical Library, Programming Guide Volume I, International Business Machines Corporation (1992), pp. 2–2, 2–3.

Chris Yates, "Taking the tedium out of installs", PC Week Online, Nov. 6, 1996.

(List continued on next page.)

*Primary Examiner*—Eddie P. Chan
*Assistant Examiner*—Kevin L. Ellis
*Attorney, Agent, or Firm*—Computer Law++

[57] ABSTRACT

A method allows non-destructive manipulation of disk partitions defined by an IBM-compatible partition table. The disk partitions may be located on one or more disks attached to one or more disk drives. Each partition has an associated file system type. An interrupted manipulation may be resumed at a point in the progress of the manipulation near the point of interruption. Available manipulations include verifying the integrity of a partition's file system structures; displaying information about a partition; moving a partition to a different location; resizing a partition; and resizing the file system clusters. The resizing steps are illustrated with particular reference to file systems which use a file allocation table. The details required to perform these manipulations are attended to by an implementing program that requires only general direction from a user. Thus, the present invention provides a method that allows users who are unfamiliar with technical intricacies to easily manipulate IBM-compatible disk partitions, including extended partitions and logical partitions.

26 Claims, 8 Drawing Sheets

U.S. PATENT DOCUMENTS

| | | | |
|---|---|---|---|
| 4,994,963 | 2/1991 | Rorden et al. | 364/200 |
| 5,062,042 | 10/1991 | Binkley et al. | 364/200 |
| 5,136,711 | 8/1992 | Hugard et al . | 395/700 |
| 5,166,936 | 11/1992 | Ewert et al. | 371/21.6 |
| 5,214,695 | 5/1993 | Arnold et al. | 380/4 |
| 5,269,018 | 12/1993 | Lee | 395/575 |
| 5,291,585 | 3/1994 | Sato et al. | 395/500 |
| 5,307,497 | 4/1994 | Feigenbaum et al. | 395/700 |
| 5,313,646 | 5/1994 | Hendricks et al. | 395/600 |
| 5,359,725 | 10/1994 | Garcia et al. | 395/500 |
| 5,361,358 | 11/1994 | Cox et al. | 395/700 |
| 5,363,487 | 11/1994 | Willman et al. | 395/275 |
| 5,371,885 | 12/1994 | Letwin | 395/600 |
| 5,457,778 | 10/1995 | Sieffert | 395/162 |
| 5,469,571 | 11/1995 | Bunnell | 395/700 |
| 5,502,839 | 3/1996 | Kolnick | 395/800 |
| 5,528,261 | 6/1996 | Holt et al. | 345/150 |
| 5,537,592 | 7/1996 | King et al. | 395/600 |
| 5,574,903 | 11/1996 | Szymanski et al. | 395/601 |
| 5,577,186 | 11/1996 | Mann, II et al. | 395/806 |
| 5,638,521 | 6/1997 | Buchala et al. | 395/311 |
| 5,659,614 | 8/1997 | Bailey, III | 380/4 |
| 5,758,165 | 5/1998 | Shuff | 395/712 |

OTHER PUBLICATIONS

"About Ghost Software", Binary Research Limited, no later than Jul. 2, 1997.

Mark Scanlon, "Re: Microsoft & Ghost", E–Mail, Jun. 6, 1997.

Doug Good, "Plastic Surgery for Ghost required", E–Mail, Jun. 23, 1997.

Ghost Manual, date unknown, Introduction and Overview.

"What is the Microsoft Windows NT Installable File System (IFS) Kit and where can I get it?", Microsoft Windows NT Questions and Answers, Microsoft Corporation (1997), no later than Jul. 2, 1997.

"WFWG 3.11 Does Not Pass Requests to Novell DOSNP.EXE", Microsoft Knowledge Base, Microsoft Corporation (1997), Article ID: Q119106, Nov. 21, 1994.

"Err Msg: 'Cannot Find FSHelper File'", Microsoft Knowledge Base, Microsoft Corporation (1997), Article ID: Q49558, Sep. 30, 1994.

Automated Client Upgrade Process, Microsoft Corporation (1989–1997), pp. 1–64.

"Disk Administrator—Convert Info", Windows NT version 3.5 (date unknown), prerelease version dated Jun. 26, 1992, version 3.1 release dated Sep. 11, 1993.

"Multidisk (Software Reviews) (ALSoft Inc.'s Utility Program)", James Finn, MacUser, vol. 5, No. 5, May 1989, p. 68.

Internet comp.archives.medos.announce posting with subject "presz111.zip—The Partition Resizer: Safe HD repartitioning", Apr. 29, 1995.

"One CD to fit them all", Barry Fox, Technology, Dec. 1994, p. 19.

PRESZ111.ZIP (Partition Resizer program submitted in *.zip form on 3.5 inch DOS disk labeled "IDS Disk One"), unknown version apparently released at least as early as Nov. 1994.

FIPS12.ZIP (FIPS program submitted in *.zip form on 3.5 inch DOS disk labeled "IDS Disk One"), alpha version 0.1 released Apr. 12, 1993, version 1.0 released May 3, 1994, version 1.2 released Oct. 20, 1994.

"Unconstrained Filenames on the PC! Introducing Chicago's Protected Mode Fat File System", Walter Oney, Microsoft Systems Journal, Aug. 1994, pp. 13–24.

"File–System Development with Stackable Layers", John S. Heidemann et al., ACM Transactions of Computer Systems, vol. 12, No. 1, Feb. 1994, pp. 58–89.

"A High Performance and Reliable Distributed File Facility", Rajmohan Panadiwal et al., Proc. 14th IEEE International Conference on Distributed Computer Systems, 1994, pp. 116–123.

Disk Administrator (screen shot), Windows NT version 3.5 (date unknown), prerelease version dated Jun. 26, 1992, version 3.1 release dated Sep. 11, 1993.

"A Subsystem for Swapping and Mapped File I/O on Top of Chorus", Lothar Borrmann et al., Proc. 13th IEEE International Conference on Distributed Computer Systems, 1993, pp. 12–19.

"Extending Device Management In Minix", C. Kavka et al., ACM SIGOPS Operating System Review, Apr. 1993, vol. 27, No. 2, pp. 35–43.

"The Logical Disk: A New Approach to Improving File Systems", Wiebren de Jonge et al., 14th ACM Symposium on Operating Systems Principles, 1993, pp. 15–28.

"An MS–DOS File System for UNIX", Alessandro Forin et al. Sep. 1993, pp. 1–23.

"Open Boot Firmware", Mitch Bradley, USENIX, Winter 1992, pp. 223–235.

"Loge: a self–organizing disk controller", Robert M. English et al., USENIX, Winter 1992, pp. 237–251.

"Go Anywhere and Do Anything with 32–bit Virtual Device Drivers for Windows$^{tm}$", Andrew Schulman, Microsoft systems Journal, Oct. 1992, pp. 15–25.

"Semantic File Systems", David K. Gifford et al., 13th ACM Symposium on Operating Systems Principles, 1991, pp. 16–25.

"Port Windows$^{tm}$ Applications to OS/2 (Almost) Painlessly with the Software Migration Kit", Eric Fogelin et al., Microsoft Systems Journal, Nov. 1990, pp. 21–30.

"Design Goals and Implementation of the New High Performance File System", Ray Duncan, Microsoft Systems Journal, Sep. 1989, pp. 01–13.

"Vnodes: An Architecture for Multiple File System Types in Sun UNIX", S.R. Kleinman, Summer 1986 USENIX Conference, pp. 238–247.

"The Generic File System", R. Rodriguez et al., Summer 1986 USENIX Conference, pp. 260–269.

"Chapter 8—File System and Network Redirector", Andrew Schulman et al., Undocumented DOS: A Programmer's Guide to Reserved MS–DOS® Functions and Data Structures, Second Edition, 1994, pp. 413.

"MS–DOS Disk Internals Chapter 8", Ray Duncan, Advanced MSDOS®, The Microsoft Guide for Assembly Language and C Programmers, 1986, pp. 161–173.

"FormatterFive$^{tm}$, Partitioning and File Transfer Utility for Macintosh®", product information sheet, 1990–1994, Software Architects Inc., Bothell, Washington.

"MultiBus Manager™, Multiple SCSI Bus Manager for the Macintosh®", product information sheet, 1994, Software Architects Inc., Bothell, Washington.

"Formatter5$^{tm}$ Pro", product information sheet, 1993, Software Architects Inc., Bothell, Washington.

"FormatterOne$^{tm}$ Pro, SCSI Manager 4.3 Driver & Utility for the Macintosh®", product information sheet; 1993, Software Architects Inc., Bothell, Washington.

"Lido 7™", product information sheet, Sep. 27, 1993, Surf City Software, Orange, California.

"MultiDisk disk partitioner", product information sheet, ALSoft Poer Utilities™, Spring, Texas.

"MultiDisk™ Disk Partitioning", product information sheet.

"GFS Revisited or How I Lived with Four Different Local File Systems", Matt Koehler, pp. 291–305.

PRESIZER.DOC (printout from PRESZ111.ZIP).

README.1ST (printout from PRESZ111.ZIP).

John Lagonikas, "Partition Resizer v. 1.1.1 Program's Manual and Technical Information", Zeleps (1994–95).

Arno Schaefer, "Welcome to FIPS Version 1.1.1", Oct. 13, 1994.

ALSoft® Power Utilities™, ALSoft, Inc. (1989–94).

Maria Tyne, Thinking Person's Guide to OS/2 2.1, John Wiley & Sons, Inc. (1993), pp. 193–195.

Additional Information regarding Doug Azaritto, in Information Disclosure Statement dated May 23, 1995 in 08/393,805.

Litigation Information, Apr. 30, 1998.

Quarterdeck's Initial Disclosure, Apr. 9, 1998.

"partition", Mar. 24, 1998.

METHOD FOR MANIPULATING DISK PARTITIONS

This application is a continuation of application Ser. No. 08/554,828 filed Nov. 7, 1995, which is a continuation-in-part of application Ser. No. 08/393,005 filed Feb. 23, 1995, now issued as U.S. Pat. No. 5,675,769; both of these applications are incorporated herein by reference.

FIELD OF THE INVENTION

The present invention permits manipulation of selected partitions of a computer disk drive. More particularly, the present invention relates to a method for safely resizing hard disk partitions and for safely altering cluster size in FAT partitions.

TECHNICAL BACKGROUND OF THE INVENTION

Computers utilize a wide variety of disks to store data. Disks are classified according to the storage medium employed, such as when "optical" disks are distinguished from "magnetic" disks. Disks are also classified as either "floppy" or "hard." Hard disks generally have greater storage capacity, faster data access times, and longer useful lives than floppy disks ("floppies"). Unlike hard disks, however, floppies are "removable." That is, floppies are easily released from, and reattached to, a disk drive which provides the computer with access to the data on the disk.

FIG. 1 illustrates a disk 2 attached to a disk drive 4. The disk drive 4 is in signal communication with a computer system 6 which makes read and write requests of the disk drive 4. The computer system 6 comprises at least one processor ("CPU") 8 which is in digital signal communication with a memory 10. Suitable memories 10 include random access memory, read-only memory, and combinations of these two memory types.

The computer system 6 is also capable of comprising at least one program storage medium 12. Suitable storage media 12 include a magnetic, optical, or other computer-readable storage device having a specific physical substrate configuration. Suitable storage devices include floppy disks, hard disks, tape, CD-ROMs, PROMs, RAM, and other computer system storage devices.

The substrate configuration represents data and instructions which cause the computer system to operate in a specific and predefined manner as described herein. Thus, the medium 12 tangibly embodies a program, functions, and/or instructions that are executable by the processor 8 to perform disk partition manipulation steps according to the present invention. In some embodiments according to the present invention, the instructions are stored on a medium 12 that also contains the disk partition being manipulated. In other embodiments, the instructions are stored on one instance of a medium 12 and the disk partition of one or more other media 12 are manipulated.

The disk 2 illustrates physical characteristics of both floppies and hard disks. The disk 2 contains a number of concentric data cylinders such as the cylinder 14. The cylinder 14 contains several data sectors, including sectors 16 and 18. The sectors 16 and 18 are located on an upper side 20 of the disk 2; additional sectors may be located on a lower side 22 of the disk 2. The sides 20, 22 of the disk 2 define a platter 24. Floppy disks contain only one platter and thus are either single-sided or double-sided. For clarity of illustration only one platter 24 is shown in FIG. 1, but hard disks often contain several platters and thus may include one, two, or more sides.

The upper side 20 of the disk 2 is accessed by a head 26 mounted on an arm 28 secured to the drive 4. To access different cylinders of the disk 2, the arm 28 moves the head 26 in toward the center of the disk 2 or out toward the periphery of the disk 2 according to the position of the desired cylinder. To access different sectors within a cylinder, the drive 4 rotates the disk 2 around a spindle 30, thereby rotating the desired sectors into adjacency with the head 26. Additional sides of a disk, including sides on additional platters, may be accessed in a similar manner by additional disk drive heads. Because each side of a disk is accessed by a corresponding disk drive head, the number of heads is sometimes used to indicate the number of sides of the disk that are accessible to the drive. For example, double-sided disks are accessed with double-headed drives.

A given sector on the disk 2 may be identified by specifying a head, a cylinder, and a sector within the cylinder. Heads are generally numbered from the top of the drive proceeding downward, beginning at zero. Cylinders are generally numbered from the outside edge of the platter proceeding inward, beginning at zero. Sectors within a cylinder are generally numbered from a marker in the disk medium proceeding either clockwise or counterclockwise, depending on the direction of disk rotation in the disk drive, and beginning at one. A triplet specifying the head number, cylinder number, and sector number in this manner is known as a "physical sector address." For instance, the sector labeled as 16 in FIG. 1 could have a physical sector address of (head zero, cylinder seven, sector two), or more concisely, a physical address of (0, 7, 2). The terms "address" and "pointer" are used interchangeably herein.

Alternatively, a given sector may be identified by a "logical sector address." Each logical sector address is a single number rather than a triplet of numbers. The logical address of a sector corresponds to the number of sectors between the addressed sector and the "first" sector on the disk 2 along some specified path which traverses all available sectors in order. The first sector, known as "sector zero," is often located at a physical sector address of (0, 0, 1). One common traversal path begins at logical sector zero, traverses the sectors in cylinder zero of head zero, traverses the sectors of cylinder zero of head one, proceeds thus through cylinder zero on each successive head, proceeds to the sectors of cylinder one of head zero, and continues in like manner. However, other disk traversal paths are also used.

The sector (exemplified by sectors 16, 18) is the smallest unit of individually addressable disk storage recognized by the disk drive 4. An individual bit within any sector can be altered only by reading the entire sector into a memory buffer, overwriting the bit in question, and then writing the entire sector back onto the disk 2.

However, software executing on the processor 8 does not always operate on individual sectors. In particular, "file system" software which helps define the format used to organize data on the disk 2 and file system "drivers" which actuate the disk drive 4 to read and write that data do not necessarily treat sectors as the smallest addressable storage unit. One commonly used file system, the File Allocation Table ("FAT") file system, is configured to allocate sectors in "clusters" of one or more sectors each. Each cluster contains $2^n$ sectors, where n is in the range from zero to Max and Max gives a cluster size of 64K bytes. The value of n is fixed when the disk 2 is initially formatted, and does not typically change during use of the disk 2. The cluster size can be changed with conventional tools by reformatting the disk 2, but such reformatting is destructive, as it destroys access to all user data that was stored in the reformatted region.

File systems are generally used in combination with "partitions" to define the physical organization of data on the disk. Partitions are often defined by the contents of a "partition table" which is located on the disk 2. For instance, MACINTOSH® computers utilize a partition table having a composition that is specifically adapted for use with the MACINTOSH operating system (MACINTOSH is a registered trademark of Apple Computer, Inc.). Many SUN® workstation computers utilize a partition table composition that is specifically adapted for use with the SunOS® File System (SUN and SunOS are registered trademark of Sun Microsystems, Inc.). Other examples abound; different partition table compositions are almost as common as different operating systems and different file systems, which number in the hundreds.

Unfortunately, different partition table compositions are usually incompatible. Detailed methods which correctly modify the contents of a first partition table will often scramble the contents of a second partition table if the first and second tables use different composition rules. A detailed method for reducing the number of disk sectors in a MACINTOSH partition, for instance, is likely to be of little help in shrinking a SunOS partition, and may even cause data loss if applied to the SunOS partition table.

One partition table composition, denoted herein as the "IBM-compatible" partition table, is found on the disks used in many IBM® personal computers and IBM-compatible computers (IBM is a registered trademark of International Business Machines Corporation). IBM-compatible partition tables may be used on both floppies and hard disks, and they may be used with magnetic disks, optical disks, and disks employing other storage media. IBM-compatible partition tables may also be used with a variety of disk sector addressing schemes, including without limitation schemes that employ traversal paths different from the path described above and schemes which assign logical sector addresses that start over again at zero for each partition on the disk.

As shown in FIG. 2, an IBM-compatible partition table 32 includes an Initial Program Loader ("IPL") identifier 34, four primary partition identifiers 36, and a boot identifier 38. As shown in FIG. 3, each partition identifier 36 includes a boot indicator 40 to indicate whether the partition in question is bootable. At most one of the partitions in the set of partitions defined by the partition table 32 is bootable at any given time.

Each partition identifier 36 also includes a starting address 42, which is the physical sector address of the first sector in the partition in question, and an ending address 44, which is the physical sector address of the last sector in the partition. A sector count 46 holds the total number of disk sectors in the partition. A boot sector address 48 holds the logical sector address corresponding to the physical starting address 42. On disks having more than 1024 cylinders, the starting address 42 and the ending address 44 contain predetermined maximum values if the actual values are too large to store in the space given in the partition table 32; the actual values can be derived from the sector count 46 and the boot sector address 48.

Some IBM-compatible computer systems allow "logical partitions" as well as the primary partitions just described. All logical partitions are contained within one primary partition; a primary partition which contains logical partitions is also known as an "extended partition." Logical partitions are represented by one or more lists of partition identifiers 36. Each list is attached in conventional fashion to one of the partition identifiers P1, P2, P3, or P4. Thus, the set of partitions defined by an IBM-compatible partition table includes any defined primary partition, regardless of whether that primary partition is an extended partition, and also includes any logical partitions defined by partition identifiers 36.

Each partition identifier 36 also includes a system indicator 50. The system indicator 50 identifies the type of file system contained in the partition, which in turn-defines the physical arrangement of data that is stored in the partition on the disk 2 (FIG. 1). The system indicator 50 utilizes predefined constant values to designate various file systems. For instance, the constant value 01H indicates a 12-bit FAT file system of the type first used by the MS-DOS® operating system (MS-DOS is a registered trademark of Microsoft Corporation). Other values designate other file systems, including the CP/M-86® file system (registered trademark of Novell, Inc), the XENIX® file system (registered trademark of Microsoft Corporation), the NOVELL file system (trademark of Novell, Inc.), a 16-bit FAT file system of the MS-DOS operating system, and the PCIX file system. Values not recognized by a particular operating system are treated as designating an unknown file system.

The system indicator 50 may designate a file system, such as the 12-bit FAT file system, which is used most widely in connection with a particular operating system, such as MS-DOS. However, operating systems and file systems are different components of the computer. The file system associated with a specific partition of the disk 2 (FIG. 1) determines the format in which data is stored in the partition, namely, the physical arrangement of user data and of file system structures in the portion of the disk 2 that is delimited by the starting address 42 and the ending address 44 of the partition in question. At any given time, each partition thus contains at most one type of file system.

The operating system manages access, not only to the disk 2, but to other computer resources as well. Resources typically managed by the operating system include one or more disks and disk drives, memory (RAM and/or ROM), microprocessors, and I/O devices such as a keyboard, mouse, screen, printer, tape drive, modem, serial port, parallel port, or network port.

The operating system accesses the disk 2 in part-through file system drivers. These drivers use internal file system data and assumptions about the file system to translate more abstract information such as file names and read/write requests into more detailed information such as sector addresses and physical disk accesses. By appropriate use of file system drivers, a single operating system can access files stored according to different file systems. For instance, the OS/2 operating system can access both FAT files and High Performance File System ("HPFS") files (OS/2 is a mark of International Business Machines Corporation). File system drivers do not alter the type of file system that is contained in a partition. Nor do file system drivers alter characteristics such as the partition's size, the partition's location on the disk 2 (FIG. 1), or the cluster size of FAT partitions.

It is sometimes desirable to alter the contents of an IBM-compatible partition table. For instance, a person using a computer may wish to expand a particular partition to allow additional data to be stored in files within that partition. Conversely, the user may wish to shrink a specified partition by allocating fewer disk sectors to the partition. It may also be convenient or necessary to move a partition to a different location on the disk while substantially or exactly preserving the number of disk sectors allocated to the partition.

One conventional approach to modification of an IBM-compatible partition table begins by copying all necessary user and system data off the disk to a temporary storage location such as a tape or another disk. The data copied includes without limitation the contents of files created by the user such as textual documents and spreadsheets, the contents of files required to run applications such as word processors, and system data such as directory information. Some internal file system data such as sector allocation maps does not necessarily need to be copied, but is often copied anyway. The familiar disk utility FDISK is then used to update the IBM-compatible partition table. The newly specified partition is then formatted with the familiar disk utility FORMAT or a similar utility. Finally, the data is copied back into the new partition on the disk. During this copying process the file system copy utility creates appropriate new file system structures reflecting the current locations of data on the disk.

This approach to partition manipulation has several drawbacks. A temporary storage device with adequate storage capacity may not be readily available or affordable under the circumstances. Even if temporary storage is available, copying large amounts of data from the disk to temporary storage and then back again can take a substantial period of time.

In addition, manipulating IBM-compatible partition tables in this manner is confusing and dangerous for many computer users. The FDISK utility assumes that the user is familiar with the intricacies of IBM-compatible partition tables, physical disk addresses, logical partitions, extended partitions; operating system assumptions regarding partitions, cluster sizes, file allocation tables, and related matters. Users who are unfamiliar with these technical details may easily and inadvertently destroy data.

Less grievous but nonetheless undesirable situations can also arise if the user miscalculates the correct size or position of the new partitions. For instance, if the partition has been made too small to receive all the data from temporary storage, it becomes necessary to once again modify the partition table with FDISK, to reformat again, and to once again copy all the data from temporary storage into the reformatted partition. Even if everything works as desired the first time, this approach to partition modification can be very time-consuming. With a typical disk holding several hundred megabytes of data the process may require several hours to complete successfully.

Some conventional partition manipulation approaches are limited to shrinking partitions. They provide no capability for expanding a partition or moving a partition to a new location on the disk while preserving the partition's size. Moreover, known approaches allow user data to be lost if power to the computer is interrupted during the partition shrinking operation.

In addition, the only previously known approach to resizing clusters in FAT partitions is destructive reformatting of the disk partition.

Moreover, known approaches to partition resizing are not integrated with means for checking the integrity and self-consistency of the file system before and after the operation. One partition resizing approach requires a shift in position of all clusters, thereby significantly increasing not only the time required to resize but also the risk of data corruption if resizing is interrupted. Moreover, such approaches lose data if any bad sectors are present in the disk partition. Finally, some known partition resizing operations do not properly handle conditions that often arise in the file system structures as a result of resizing.

Thus, it would be an advancement in the art to provide a method that allows users who are unfamiliar with technical intricacies to easily resize and reconfigure IBM-compatible disk partitions without destroying any user data.

It would also be an advancement to provide such a method which either increases or decreases FAT cluster size, as desired.

It would be a further advancement to provide such a method which prevents data loss caused by interruptions such as a power failure during the manipulation of a partition.

It would also be an advancement to provide such a method which properly resizes and reconfigures logical partitions and extended partitions.

It would be a further advancement to provide such a method which efficiently tests the integrity and consistency of the file system data within a partition.

Such a method for manipulating disk partitions is disclosed and claimed herein.

BRIEF SUMMARY OF THE INVENTION

The present invention provides a method for manipulating disk partitions defined by an IBM-compatible partition table. The disk partitions may be located on one or more disks attached to one or more disk drives. Each partition has an associated file system type, such as 12-bit FAT or 16-bit FAT.

According to the present method, the partition table is initially read from the disk. The table contents may contain an RPI system indicator, which indicates that an earlier attempt at partition manipulation was interrupted by a power failure. If the RPI is present on the disk, an informing step notifies the user that the interrupted manipulation is being resumed. Otherwise, steps are taken to lock out other processes that could interfere with the requested partition manipulation. A data recovery method such as checkmarking or journaling is also used to allow resumption of the method near the point of interruption.

Available manipulations include, without limitation: checking or verifying the integrity and internal consistency of a partition's file system structures; displaying information about a partition such as its location, size, and associated file system type; moving a partition to a different location on a disk that presently holds the partition or to another disk; molding or resizing a partition to include a different number of disk sectors within the partition; and resizing clusters in a FAT partition.

Steps are taken at one or more points in the manipulation to detect inconsistencies in the file system data structures or other breaches in the integrity of the selected partition. If errors are detected, the user is informed. Conditions on the disk that were changed by the present method are then restored to the extent possible and control is returned to the invoking environment.

The resizing step is illustrated with particular reference to FAT file systems, but is also useful in reshaping partitions which hold a variety of other file systems. During a bounds determining step the maximum and minimum sizes of the desired modified partition are determined. An edge determining step takes appropriate actions depending on which edges of the selected partition are being moved to produce the modified partition. A size determining step determines the exact size of the modified partition by specifying the starting and ending physical addresses of the modified partition.

If the selected partition is being expanded, then certain additional steps are taken after the size determining step.

The disk sectors being added may be tested first to locate and block out any bad sectors during a blocking step. During a creating step, a recovery sector is created on the very last sector of the proposed modified partition to permit data recovery in the event the manipulation is interrupted. During an adjusting step the contents of the partition table are adjusted to reflect the larger size of the modified partition and the RPI is placed on the disk, making the partition unrecognizable to MS-DOS, OS/2, and other familiar operating systems. File allocation table entries are created as needed for the new area of the disk.

Regardless of whether the partition is being reduced or expanded, a size determining step determines the size and location of file system structures in the modified partition. An adjusting step then adjusts the size, location, and contents of the file system structures as needed to reflect differences between the selected partition and the modified partition. An exiting step releases any temporarily allocated disk space, removes the RPI from the disk, generally cleans up, and then returns control to the software which invoked it. In some cases the exiting step forces the computer to reboot so that changes in the partition table or file system structures will be detected by the operating system.

The moving/copying step, which is useful in replicating partitions utilizing a variety of familiar or unknown file systems, proceeds substantially as described in the '805. application. The '805 application description of partition replication is incorporated herein by this reference.

The details required to perform these manipulations are attended to by an implementing program that requires only general direction from a user. Thus, the present invention provides a method that allows users who are unfamiliar with technical intricacies to easily resize and reconfigure IBM-compatible disk partitions, including logical and extended partitions. The present method also utilizes the RPI and data recovery steps to prevent data loss caused by interruptions such as a power failure during the manipulation of a partition. The method also efficiently tests the integrity and consistency of the file system data within a partition at various points during the manipulation.

The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference is now made to the figures wherein like parts are referred to by like numerals. The present invention relates to a method for physically manipulating disk partitions. As noted above, each partition has an associated file system type, such as 12-bit FAT, 16-bit FAT, FAT-compatible, CP/M-86, XENIX, NOVELL, PCIX, or HPFS. The present invention will be illustrated mainly by reference to FAT partitions defined as primary partitions on the disk 2 (FIG. 1) by an IBM-compatible partition table. However, those of skill in the art will appreciate that the scope of the present invention comprises manipulation of both primary and logical partitions on one or more disks of various kinds.

The present invention will also be illustrated mainly in connection with FAT partition resizing and FAT cluster resizing. However, the scope of the present invention also comprises partition resizing in combination with cluster resizing, as well as cluster resizing in combination with partition moving, replicating, and other steps disclosed in the '805 application, which are incorporated herein by this reference.

Those of ordinary skill in the art have a working knowledge of the disk 2, the disk drive 4, and the internal file system structures on the disk 2 and in computer memory. They will also have an understanding of operating systems and file systems in general. With regard to FAT file systems, Chapter Eight of *Advanced MS-DOS: The Microsoft guide for Assembly Language and C programmers*, by Ray Duncan, ISBN 0-914845-77-2, 1986, which describes the structure of a FAT file system, is incorporated herein by this reference.

Overview of Disk Partition Manipulation

Figure 4:
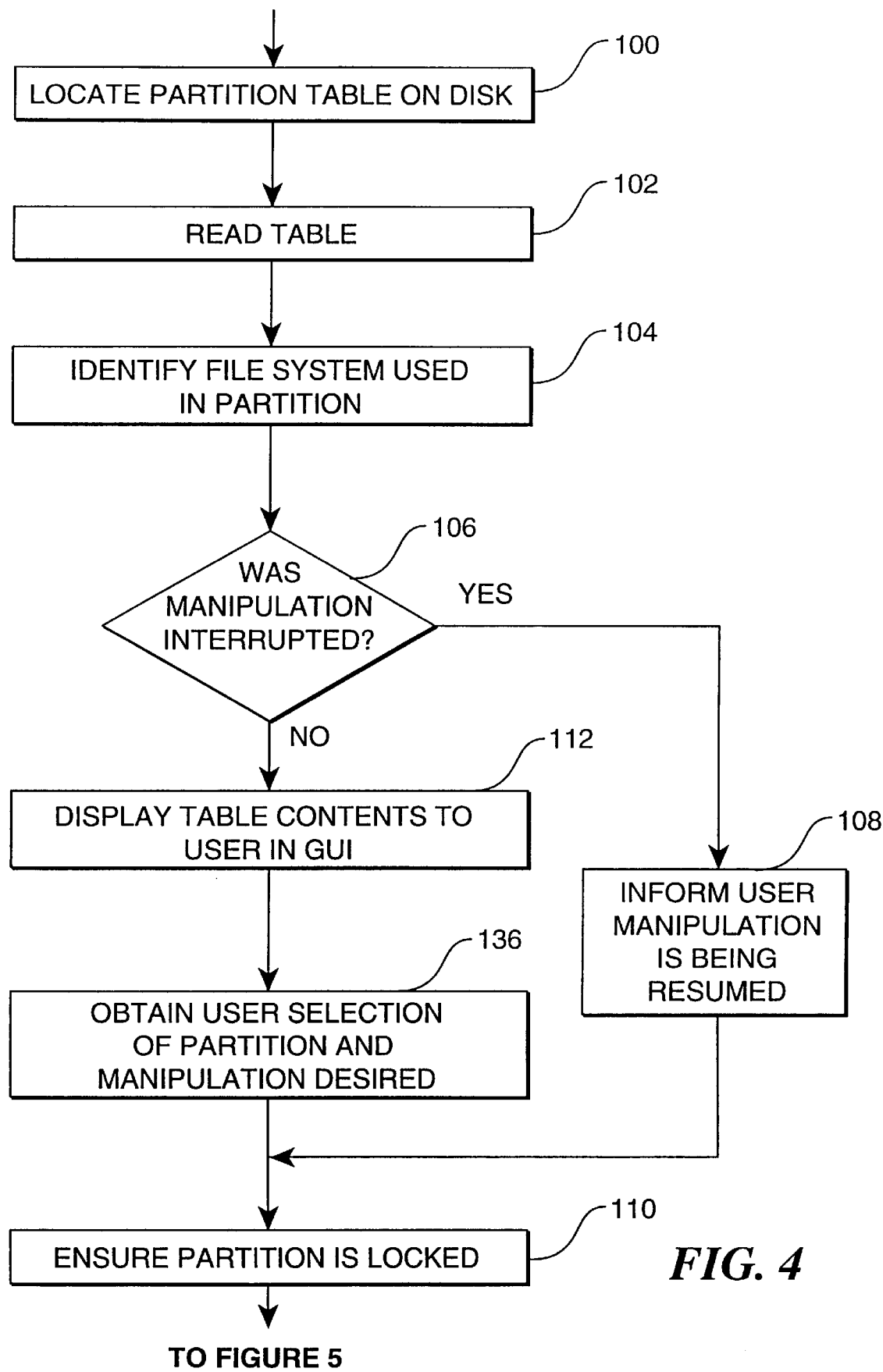
FIG. 4 is an initial portion of a flowchart illustrating a preferred method of the present invention.
Figure 5:
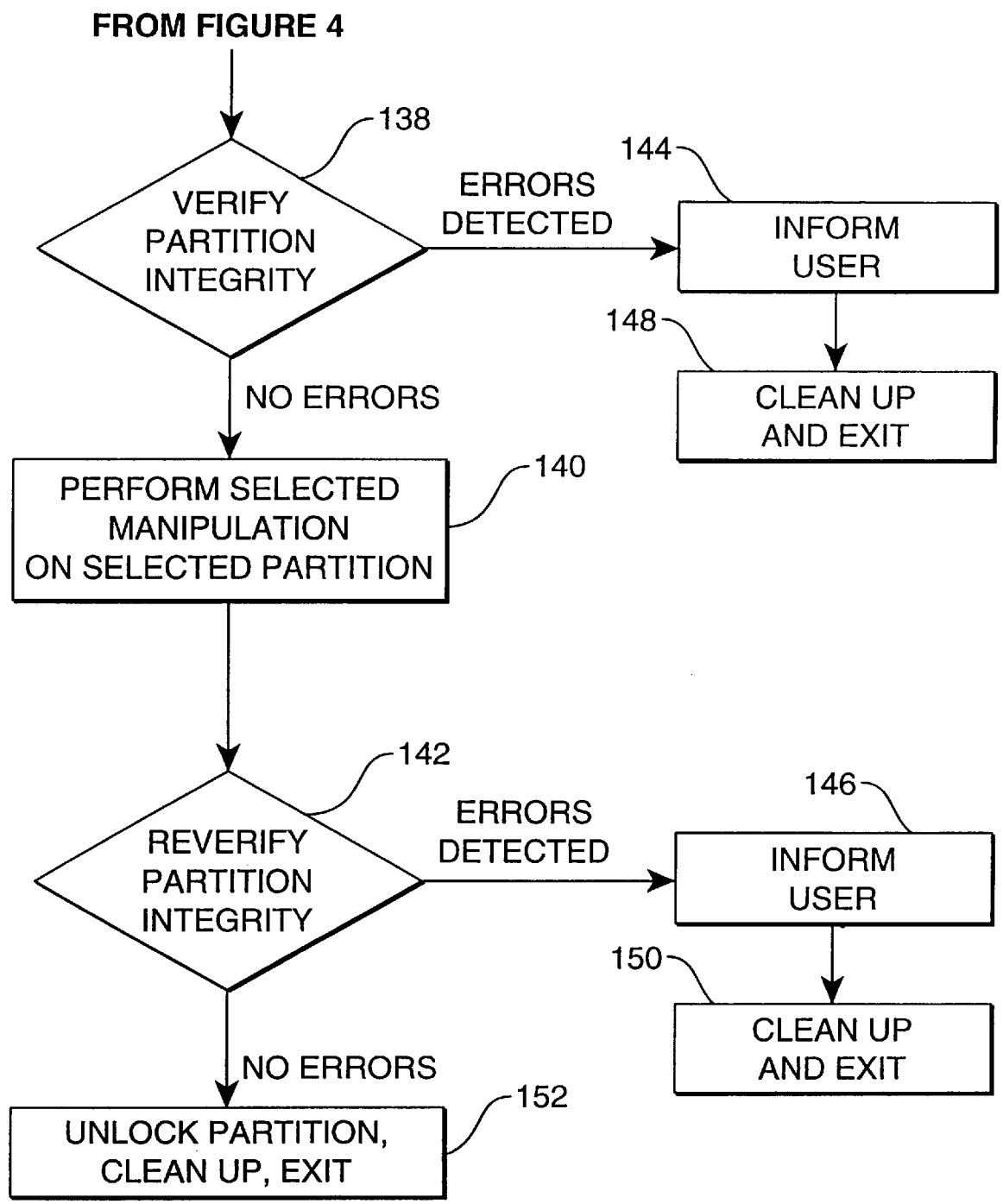
FIG. 5 is an additional portion of the flowchart shown in FIG. 4.

A preferred method of the present invention for manipulating disk partitions is illustrated by a flowchart in FIGS. 4 and 5. A computer program which implements this flowchart and/or other teachings of the present invention in order to assist users in molding disk partitions is referred to herein as an "implementing program." Those of skill in the art will readily create appropriate implementing programs according to the present invention by using computer languages such as C or C++, conventional compilers and linkers, and other tools familiar to computer programmers. Implementing programs may execute on conventional digital computers, including without limitation IBM-compatible personal computers.

All critical portions of the implementing program, such as those containing disk updates, are preferably protected by proper utilization of a data recovery method. A checkmarking data recovery method prevents data loss unless failure occurs in the middle of a disk write. Checkmarking stores progress markers on the disk within a selected partition. The progress markers correspond to incrementally increasing portions of the modification of the selected partition, thereby removing the need to repeat all of those portions over again if the modification is resumed after the flow of electric power to the disk drive is temporarily interrupted. A journaling data recovery method is generally faster than the checkmarking method and prevents data loss even if power fails in the middle of a disk write. Journaling preserves at least one copy of all user data on the disk at all times during the partition modification, thereby reducing the risk of loss of user data if modification is temporarily interrupted. According to alternative methods of the present invention, a data recovery method familiar to those of skill in the art may also be employed.

In a locating step 100, an IBM-compatible partition table (FIGS. 2 and 3) is located on the disk 2. The IPL 34 (FIG. 2) of the partition table is typically located at the beginning of the disk sector whose logical address is zero; the other portions of the partition table follow according to the partition table composition described herein and concepts familiar to those of skill in the art.

The partition table is then read from the disk 2 by a reading step 102. Reading is accomplished by one or more conventional disk sector read operations directed by the implementing program. Multiple read operations may be required to obtain the contents of partition identifiers 36 (FIG. 3) that define logical partitions. The copy of the table contents thus obtained may be left in the same relative positions in computer memory as they were in on the disk 2. Alternatively, the table contents in memory may be rearranged into data structures that are more convenient for use in the succeeding steps of the method. Those of skill in the art will readily determine appropriate data structures according to the teachings herein.

In this preferred method of the present invention, the table contents may contain an indication that an earlier attempt at partition manipulation has been interrupted. One cause of such an interruption is a temporary interruption of the flow of electrical power to the computer. Interruptions may also occur as a result of soft resets, hard resets, faulty hardware, or other circumstances.

It is presently preferred that an incomplete partition manipulation resulting from such an interruption be indicated by the presence of a unique "recovery partition identifier" ("RPI") in the system indicator 50 (FIG. 3) of a partition identifier 36 (FIG. 3) in the partition table. The RPI indicates that the partition is a "recovery partition," namely, that the partition is in a condition not associated with any known file system such as a particular FAT file system but is rather in a transitional state corresponding to interruption of the present method. Thus, any value not corresponding to a previously known file system and capable of representation in the space allotted to the system indicator 50 is an acceptable RPI value. One presently suitable RPI value is 3C hexadecimal; other suitable values may be identified by surveying the values used by familiar operating systems and file systems.

Accordingly, an identifying step 104 identifies the file system associated with each partition defined by the partition table. The identifying step 104 may be implemented by a table look-up, by a case or switch statement, or by another familiar means which recognizes the RPI of the present invention. An interrogating step 106 then checks the result of the identifying step 104 to determine whether an RPI was found in any of the partition identifiers 36.

If the interrogating step 106 determines that a partition manipulation was interrupted, an informing step 108 notifies the user that the interrupted manipulation is being resumed. The method then proceeds to a partition lock ensuring step 110. On the other hand, if the interrogating step 106 determines that no incomplete manipulation is pending, then a displaying step 112 displays at least a portion of the partition table contents to the user. The displaying step 112 preferably utilizes a graphical user interface ("GUI") in the implementing program to provide users with feedback regarding the current partition configuration and a command interface for molding that configuration.

Figure 6:
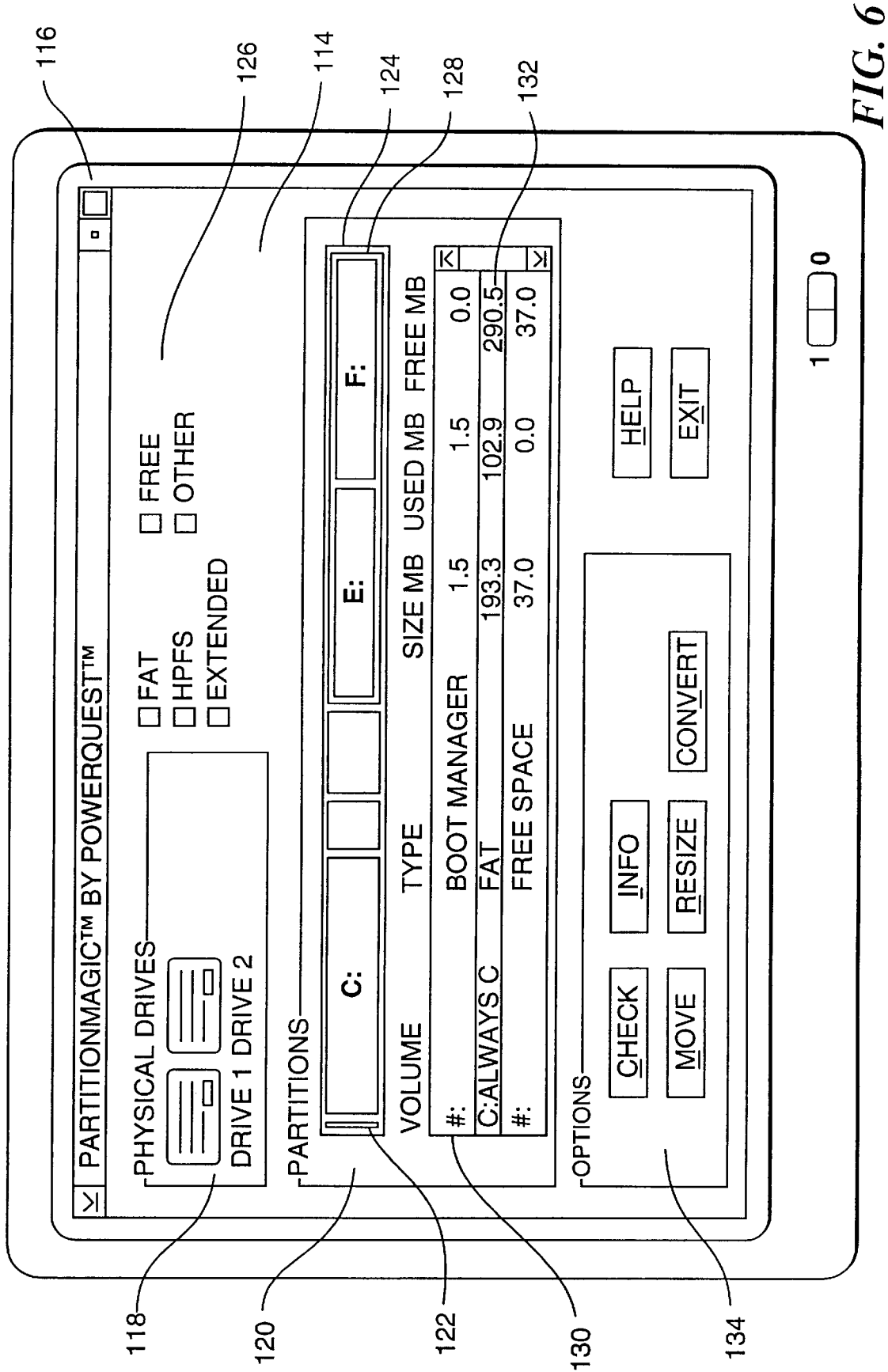
FIG. 6 is a front view of a computer screen illustrating a graphical user interface to a computer-based implementation of the present invention.

One suitable GUI 114 is illustrated in FIG. 6. The GUI 114 is displayed on a computer screen 116 by the displaying step 112 (FIG. 4). The GUI 114 illustrated is part of a PartitionMagic program which implements aspects of the invention of the '805 application and is commercially available from PowerQuest Corporation of Orem, Utah. PartitionMagic and PowerQuest are trademarks of PowerQuest Corporation.

The GUI 114 includes a drive group box 118 which provides the user with information regarding the physical disk drives attached to the computer, including the drive names. Icons corresponding to the drives are preferably highlighted or otherwise altered in appearance to indicate the drive or drives for which partition information is presently being displayed.

A partition graph 120 provides information regarding the partitions presently defined by the partition table, including the names, relative positions, and file system types of the partitions. The left end 122 of the partition graph 120 corresponds to the disk sector at the lowest physical address (which is typically (0, 0, 1)), while the right end 124 of the partition graph 120 corresponds to the disk sector at the highest physical address on the particular disk in question.

Colors or graphical patterns may be used in the partition graph 120. The colors or patterns are selected from a legend 126 that matches colors to file system types, to free space not claimed by any partition, and to partition characteristics such as "extended" or "other" (unrecognized system identifier). In the example shown in FIG. 6, partitions E: and F: are enclosed by a box 128 to indicate that they are logical partitions. Partition C: is a primary partition, as indicated by the absence of an enclosing box.

Partition C: is also the current "selected partition," namely, the partition regarding which information is sought or upon which a manipulation operation is or will shortly be performed. Additional information about the partitions is provided in a partition list 130, with the details 132 regarding the currently selected partition (partition C:) preferably high-lighted or otherwise altered in appearance.

An option box 134 lists the partition manipulation operations that are available through this implementation of the present method. As described herein, these manipulations include checking or verifying the integrity and internal consistency of a partition's file system structures; displaying information about a partition such as its location, size, and associated file-system-specific details such as FAT cluster size; moving a partition to a different location on a disk that presently holds the partition or to another disk; resizing a partition to include either a lesser or greater number of disk sectors within the partition; and converting a partition from one file system configuration to another file system configuration. As used herein, a "file system configuration" includes a particular file system (e.g., HPFS, 12-bit FAT) as well as basic file system parameters such as the FAT cluster size.

With reference to FIGS. 4 through 6, users interact with the implementing program through an interface such as the GUI 114 and through a mouse, a keyboard (neither shown), or other familiar input devices. During an obtaining step 136 user interaction results in selection of a partition and selection of a manipulation operation. Selections are communicated and acknowledged by means familiar to those of skill in the art.

The locked status of the selected partition (partition C: in FIG. 6) is then ensured during the lock ensuring step 110. Thus, if the lock ensuring step 110 is reached by way of step 108, then the manipulation is being resumed after an interruption and the selected partition may already be locked by the RPI. However, if no interruption occurred, that is, if step 110 is reached by way of steps 112 and 136, then locking is ensured by an operating-system-level lock, by halting other processes, by placing the RPI, or by some combination of these steps.

It is necessary to lock the selected partition to prevent processes other than the implementing program from accessing the partition while it is manipulated according to the present invention. Those of skill in the art will appreciate that such unexpected accesses by other processes may cause significant data loss.

Locking may be accomplished by one or more methods. It is presently preferred that access be prevented by engaging an operating-system-level partition lock such as is provided in certain operating systems. For example, the OS/2 operating system provides the capability to lock a logical drive, as identified by the drive letter, as well as the capability to lock an entire physical drive.

Operating-system-level partition locks are not available on some computers. In manipulating partitions on such computers, the user is preferably instructed to stop all non-implementing program processes, tasks, TSRs, and the like from executing. That is, the user must ensure that the implementing program alone has access to the disk(s) that hold the selected partition and the proposed modified partition.

A power failure or other condition which causes the computer to reboot may disable operating-system-level partition locks and/or restart non-implementing program processes which are capable of accessing the disk(s) that hold the selected partition and the proposed modified partition. It is therefore preferred that locking also be provided through the use of an RPI as described herein.

Locking by placement of the RPI on the disk preferably comprises the following steps. First, a free disk sector is located within the selected partition on the disk 2. The disk sector is allocated by updating the file allocation table or comparable structure, and the current system indicator 50 (FIG. 3) value for the selected partition is stored on the disk 2 in the newly allocated sector.

The system indicator 50 on the disk 2 is then overwritten so that the partition identifier 36 corresponding to the selected partition contains the RPI. According to industry convention, an operating system will refuse to recognize partitions that are associated with a file system that is unknown to the operating system. By definition, the RPI corresponds to no known file system, so replacing a conventional system indicator value by the RPI effectively prevents the operating system and processes which run within constraints defined by the operating system from accessing the selected partition. The implementing program of the present invention is not thus constrained.

Thus, if the power fails prior to completion of the present method, the operating system will typically refuse to mount the selected partition and thus be prevented from trying to automatically "fix" the selected partition. However, the implementing program will detect the interruption by the presence of the RPI. The implementing program may then either properly complete the manipulation or, if that is not possible, the implementing program may attempt to place the selected partition in a more consistent and conventional condition before exiting. In extreme cases, the implementing program may resort to a data-salvaging step to allow the user to extract selected files for copying to another storage medium.

In the preferred method illustrated herein, great care is taken to detect inconsistencies in the file system data structures or other breaches in the integrity of the selected partition. Thus, a verifying step 138 precedes a partition manipulating step 140, and a reverifying step 142 follows the manipulating step 140. The steps 138 and 142 are collectively termed "verifying steps" herein. In the method illustrated, the verifying step 138 and the reverifying step 142 perform substantially identical tests on the file system at different times. In alternative methods according to the present invention, the verifying steps 138 and 142 may each perform different tests. Some methods of the present invention omit either or both of the verifying steps 138 and 142.

The tests performed during the verifying steps 138 and 142 depend on the particular file system that is associated with the partition; the file system was identified during the identifying step 104. To prevent data loss, tests are not performed on unknown file systems. However, disk reads may be used to test partitions associated with unknown file systems for "bad sectors," namely, disk sectors that are unreliable due to faults in the disk media or (occasionally) to disk drive hardware problems.

In testing the integrity of a FAT file system the verifying steps 138 and 142 may search for lost clusters, illegal values in the boot sector, or inconsistencies between copies of the file allocation table (if duplicate copies are present). In short, the verifying steps may generally perform those checks that are typically performed by the MS-DOS disk utility program CHKDSK. The verifying steps may be performed in a manner familiar to those of skill in the art or by novel methods in concert with the teachings herein. The present method preferably resizes a selected partition such that the resulting modified partition passes any industry standard CHKDSK program with no serious errors. Some of the rules to accomplish this are set forth herein; others are readily determined by those of skill in the art.

If errors are detected by the verifying step 138 or by the reverifying step 142, the user is informed by respective informing steps 144 and 146. Conditions on the disk 2 that were changed by the present method are then restored to the extent possible and the method relinquishes control of the disk 2 and the CPU during respective exiting steps 148 and 150. If no file system data structure errors are detected, the selected partition is unlocked during an exiting step 152, thereby opening the disk 2 for access by processes other than the implementing program. Other conditions on the disk 2 that were changed by the present method are also restored, to the extent that such restoration is consistent with the desired results of the manipulating step 140, during the exiting step 152. In alternative methods, some or all of the actions performed during the exiting step 152 are also performed, or are performed instead, at the end of the manipulating step 140 as described hereafter.

Those of skill in the art will appreciate that particular operating systems may fail to detect changes in the partition table or file system structures made by the implementing program. In such cases, the exiting step in question (such as step 148, 150, 152, 178, and 204) forces the computer to immediately reboot so that such changes will be detected by the operating system. Depending on the operating system involved, such changes may also be made known to the operating system through a system call rather than a reboot.

Figure 1:
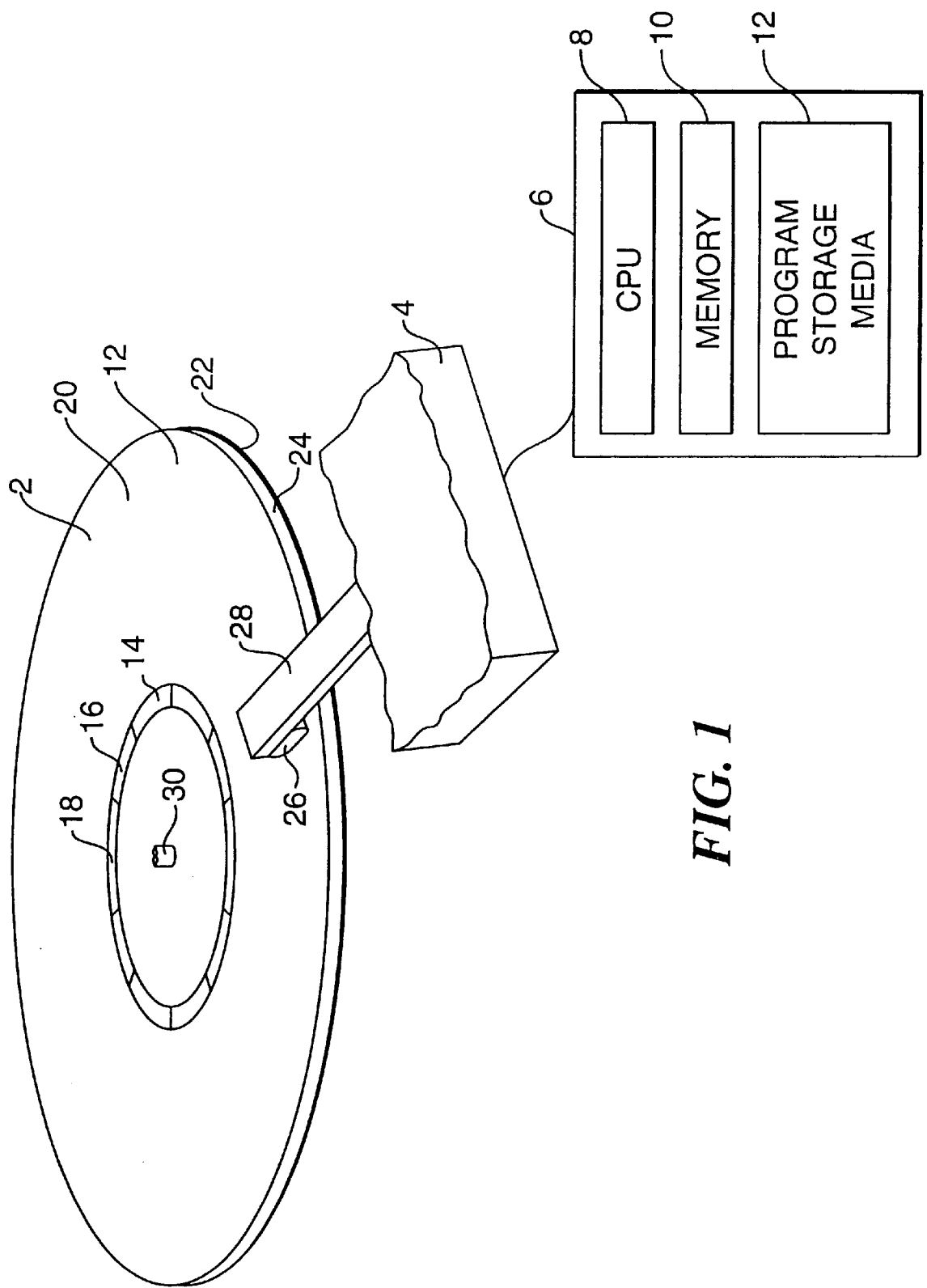
FIG. 1 is a partial cut-away view of a computer disk drive.
Figure 7:
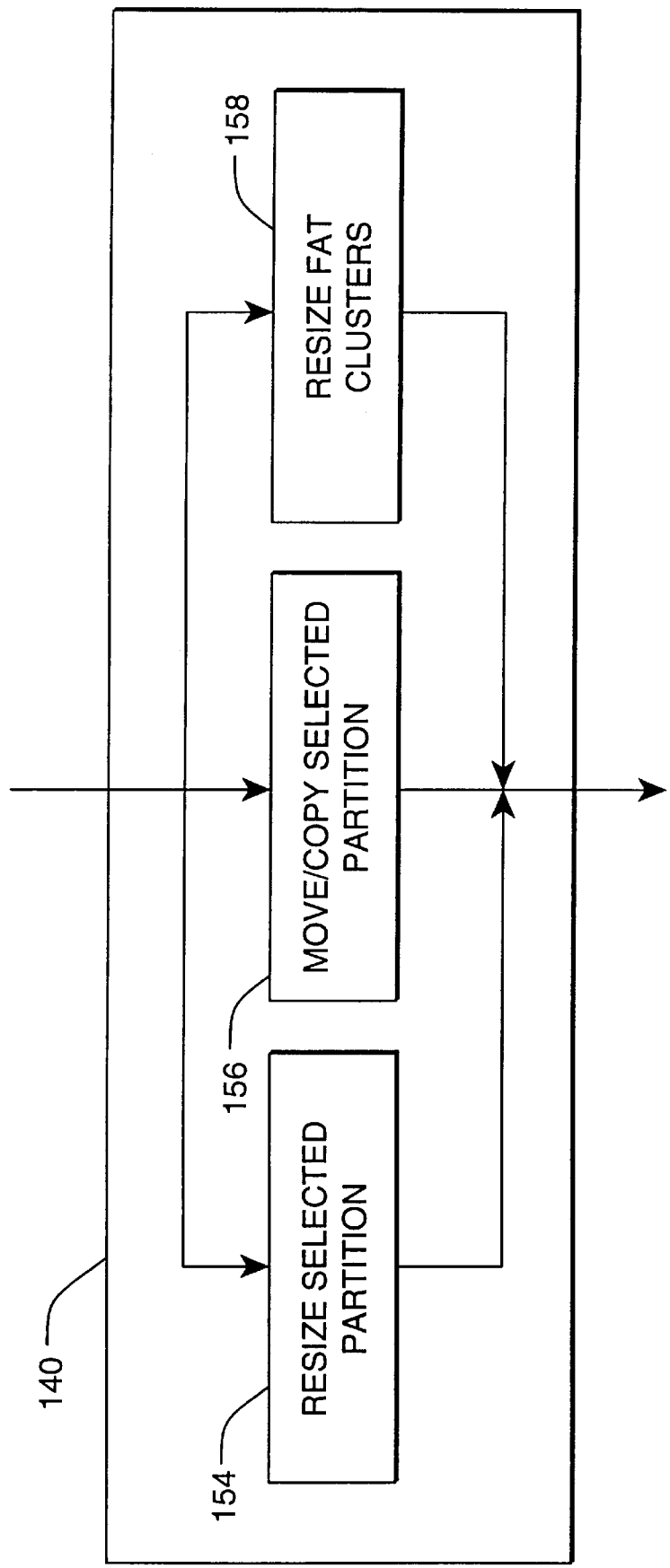
FIG. 7 is a flowchart further illustrating a partition manipulating step shown in FIG. 5.

With reference to FIG. 7, the partition manipulating step 140 comprises a partition-resizing step 154, a moving/ copying step 156, and a cluster-resizing step 158. The partition-resizing step 154 provides the capability of resizing the selected partition to include either a lesser or greater number of disk sectors. The moving/copying step 156 provides the capability of either moving or copying the selected partition to a different location on the disk 2 or to a disk attached to a different disk drive than the drive 4 (FIG. 1). The cluster-resizing step 158 provides the capability of changing the cluster size used in a FAT file system. In a preferred embodiment, the cluster size can be either decreased or increased.

Resizing Disk Partitions

Figure 8:
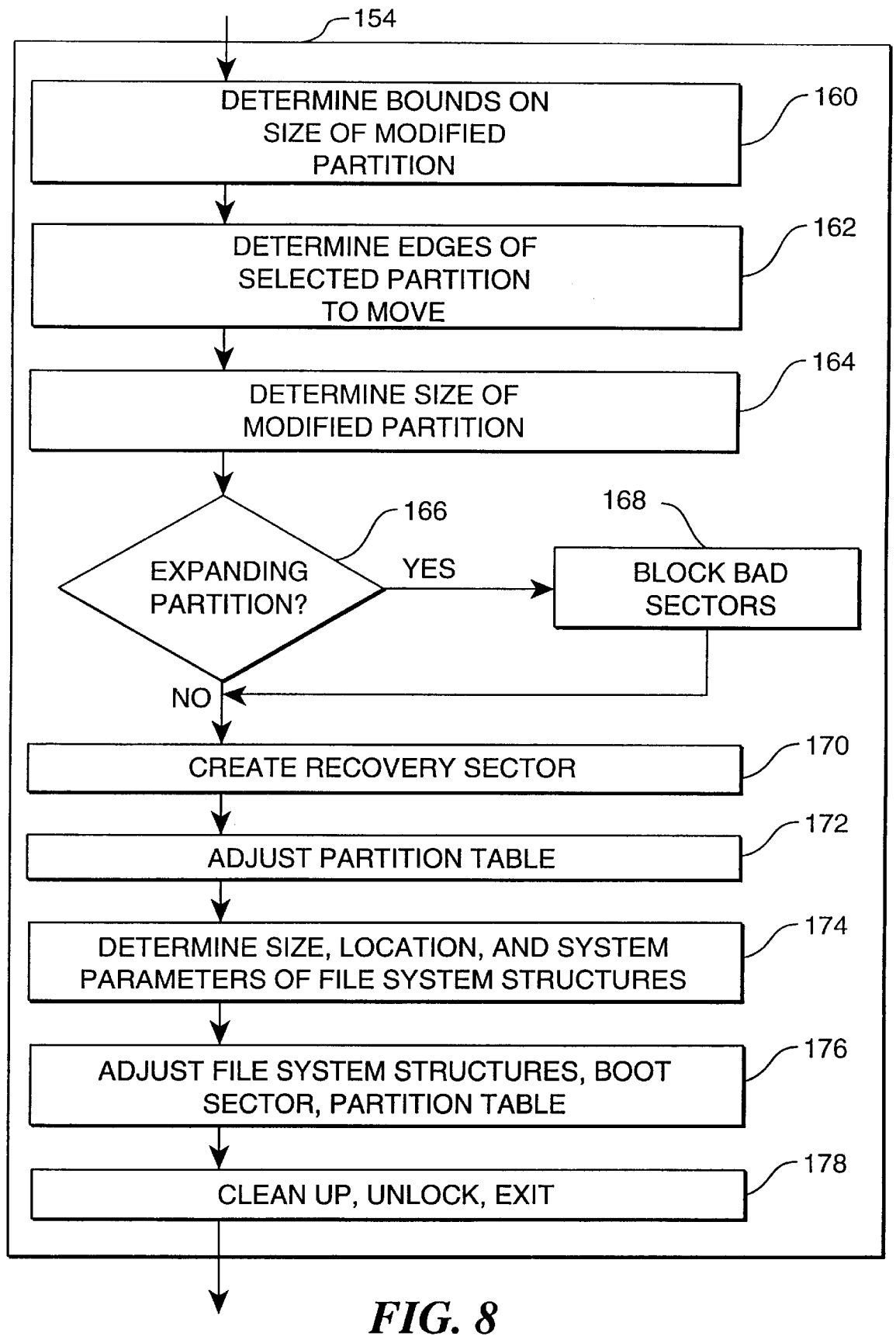
FIG. 8 is a flowchart further illustrating a partition resizing step shown in FIG. 7 in connection with a partition employing a FAT file system.

A flowchart illustrating one method for accomplishing the partition-resizing step 154 is shown in FIG. 8. As suggested above, steps are preferably taken to prevent data loss in the event that partition resizing is interrupted. Suitable steps include the use of a data recovery method such as checkmarking or journaling in conjunction with the partition-resizing step 154.

During a bounds determining step 160, the maximum and minimum sizes of a "modified partition" and corresponding "modified cluster size" are determined. As used herein, the "modified partition" is a partition which is created from a selected partition by the manipulating step 140 (FIG. 5). The "modified cluster size" is the size of each cluster in a modified partition which uses the FAT file system. Partition resizing and cluster resizing may be performed on a selected partition either independently of one another or in combination.

Like other partitions, the modified partition has a "left" edge corresponding to the disk sector with the lowest sector address of any sector in the modified partition, and a "right" edge corresponding to the disk sector with the highest sector address of any sector in the modified partition. The modified partition cannot be safely expanded to push either its left edge or its right edge beyond either a neighboring partition boundary or a physical disk boundary. The edges of other partitions and of the disk 2 (FIG. 1) thus constrain the maximum size of the modified partition.

The minimum size of the modified partition is at least the size of the data stored in the current partition plus the size of the system structures needed to organize that data plus the total size of any bad sectors within the modified partition. The minimum modified partition size of a FAT partition depends on the disk space consumed by the root directory, by the file allocation table(s), and the user data. The present invention treats all user data in the current partition as data that should appear in the modified partition. However, users may elect to delete files to reduce the size of the data stored before resizing.

The size of the modified partition may also be constrained by particular file systems or operating systems. For example, current FAT file systems have a maximum size that is based on the cluster size. Other possible constraining factors include the total size of all files and directories currently allocated in the selected partition, the number of subdirectories in the selected partition, the minimum free space required in the modified partition, the disk space likely to be consumed by file system structures in the modified partition, and a safety factor which permits the creation of additional file system allocation sectors for anticipated file growth.

The minimum modified cluster size is determined by the size of the modified partition according to relationships set forth in Table 1 below. Values in Table 1 are in bytes; 1K=1024 bytes and 1M=$1024^2$ bytes. Cluster size may also be specified in terms of the number of sectors per cluster. For simplicity, the discussion herein of FAT file systems assumes a 512-byte logical sector size inside FAT partitions and a 512-byte physical sector size on the disk 2 (FIG. 1). However, those of skill in the art will readily use the present invention with other sector sizes.

TABLE 1

| Cluster Size | Maximum Partition Size |
| --- | --- |
| 512 | Up to 32M |
| 1K | Up to 64M |
| 2K | Up to 128M |
| 4K | Up to 256M |
| 8K | Up to 512M |
| 16K | Up to 1024M |
| 32K | Up to 2048M |
| 64K | Up to 4096M |

The minimum value of the modified cluster size may also be restricted by a lack of free space in the modified partition. When the modified cluster size is halved, the space required to hold one copy of the file allocation table doubles because the file allocation table must be large enough to hold twice as many cluster numbers. But in general, the amount of free space needed for expansion of the file allocation table(s) is relatively small compared to the partition size.

The maximum modified cluster size may also be constrained by the amount of free space on the disk 2. Increasing the cluster size causes each file, on average, to consume an additional half cluster. Thus, if a partition contains 100 files, the current cluster size is 2K, the desired modified cluster size is 4K, and the disk 2 only has 150K of free space, the cluster resizing could fail if attempted. In this and other situations in which there is a clear risk of failure due to insufficient free space, the implementing program preferably refuses to perform the requested operation. Instead, the implementing program explains the situation to the user and suggests that unneeded files be deleted to free up a specified amount of additional disk space. In no case should an implementation attempt a particular cluster resizing operation or any other operation if doing so places user data at risk.

The partition-resizing step 154 can be performed by moving the selected partition's left edge, by moving its right edge, or by moving both edges. The choice of edges to move may be specified by the user through the GUI 114 (FIG. 6) or by default in the implementing program. An edge determining step 162 takes appropriate actions depending on the edge or edges being moved. If the right edge will be moved, then no sector addresses inside the existing system and directory structures need to be modified. Moving the right edge to perform the partition-resizing step 154 is the easiest approach and is thus the preferred default.

If resizing is to be accomplished by moving the left edge or by moving both edges, then all sector addresses listed in all directory and other file system structures must be adjusted by a constant $N_{left\_edge\_shift}$ which equals the number of disk sectors by which the selected partition's left edge will be moved. If the left edge is moved to the left, $N_{left\_edge\_shift}$ must be added to each sector address; if the left edge is moved to the right, $N_{left\_edge\_shift}$ must be subtracted from each sector address. This adjustment by $N_{left\_edge\_shift}$ can be performed safely only when the partition has been changed into a recovery partition type by placement of the RPI on the disk 2 as described herein. Otherwise, if the implementing program is interrupted during the adjustment the partition's file system integrity will likely be compromised and data may be lost.

If the left edge of the partition will be moved closer to the right edge, then all the data and the file system structures between the current left edge position and the new position must be relocated before the left edge is repositioned. In addition, it will generally be necessary to move the critical boot sectors and any other file system structures that must be placed at a predefined offset within the modified partition. Accordingly, a "recovery sector" is created as explained below, and the boot sectors and other structures are preserved on disk at a location recorded in the recovery sector prior to moving the partition's left edge.

It will be appreciated that if any one of the first disk sectors of a proposed modified FAT partition are bad sectors and if those sectors would receive structures that must be placed at a predefined offset within the modified partition, then the proposed left edge cannot be used. Otherwise, the integrity of the modified partition will be severely compromised because the main boot sectors and other necessary structures would reside at least partially within those bad sectors. Thus, it may be necessary to repeat steps 160 and 162 more than once to find an acceptable left edge location before proceeding to a size determining step 164.

The size determining step 164 determines the exact size of the modified partition by specifying the starting and ending physical addresses of the modified partition. These physical addresses may correspond exactly to positions specified by the user, or they may reflect adjustments to achieve a partition size that is a multiple of the cluster size. At the conclusion of the size determining step 164, the implementing program has a definite value for the desired size of the modified partition, and an indication as to which edge(s) must be moved in order to resize the selected partition.

The selected partition may be either reduced or expanded during the partition-resizing step 154. If the partition is reduced, no disk sectors outside the selected partition's boundaries will be added to produce the modified partition. If the selected partition is expanded, then disk sectors which are either to the left of the selected partition's left edge or to the right of its right edge will be included in the modified partition. A querying step 166 selects between reduction and expansion.

If the selected partition is being expanded, then the disk sectors being added may be tested first to locate and block out any bad sectors during a blocking step 168. The disk area being added to the selected partition to create the modified partition ("new area") may be tested for bad sectors as follows. First, write a known pattern to each sector sequentially from the first sector in the new area to the very last sector. This has the effect of flushing any software or hardware disk cache that might otherwise invalidate the test results. Then read the sectors that were just written.

Flushing may be quite time-consuming, so it should be skipped if there is a way to otherwise guarantee that the sectors to be tested are not already in the computer's memory. In many computer systems, flushing is not required because it is very unlikely that sectors not already inside the selected partition will have been read into memory.

Next, maintain a list or table of the addresses of bad sectors identified during the flushing and subsequent reading. Bad sectors are identified as such by an error code from the disk drive to the implementing program indicating that the sector write failed. To reduce the amount of time spent moving the disk drive head 26 (FIG. 1), the disk sectors are preferably accessed in consecutive order, as is known in the art. The addresses of any sectors for which the sector access (read or write) failed is added to the list of bad sectors. The result is a complete list or table in computer memory of all bad sectors in the new area of the disk 2.

According to one alternative method of the present invention, the test for bad sectors in the new disk area is omitted if a "fast format" flag has been set. Those of skill in the art will appreciate that while this omission tends to substantially decrease the time required to expand the selected partition, omitting the test also introduces the possibility that a file system structure will be assigned storage locations in one or more bad disk sectors. Such an approach is unreliable and places the integrity of the file system at risk. The tradeoff is therefore between safety and speed.

Many contemporary disks have almost flawless media with few or no bad sectors, and many disk drives provide internal hardware support for revectoring bad sectors without direct intervention by the operating system or by a file system driver. On such systems the risk of data loss from skipping the test for bad sectors is very small. However, the implementing program may be unable to access DIP switch settings, memory-mapped disk drive registers, or other hardware to determine the age or revectoring capability of the disk drive 4. It is therefore generally preferred to perform the test for all bad sectors. At a minimum, it is preferred that the new locations on the disk 2 which are targeted to hold the file system structures be tested so that bad sectors can be identified and avoided.

During a creating step 170, a recovery sector is created on the very last sector of the proposed modified partition. The finished recovery sector contains the system indicator 50 (FIG. 3) of the selected partition, and an indication of the partition manipulation being performed (such as "shrinking partition from 200 megabytes down to 127 megabytes by moving the right edge toward the left edge"), and information on the type of data recovery method being used to protect the user's data. During partition manipulation, additional information is stored in the recovery sector as required by the recovery prevention method to allow resumption of the method at an appropriate point within the method after power failure or another interruption.

If it is determined that the last sector of the modified partition is occupied by the selected partition, then the data in that last sector is moved to another free sector to make room for the recovery sector. This determination is made by scanning all file system structures and directories to determine which structure or file uses this last sector. Once the internal file system structures using the last sector are identified, the sector is copied elsewhere and the appropriate file system structures are updated to reflect the new location. This is preferably accomplished in concert with the data recovery method being used.

During an adjusting step 172, the contents of the partition table 32 (FIG. 2) are adjusted to reflect the larger size of the modified partition, if the selected partition is being expanded. The partition system indicator 50 (FIG. 3) is replaced by the RPI, making the partition unrecognizable to MS-DOS, OS/2, and other familiar operating systems. If the partition table is located near the left edge of the selected partition, then the partition table 32 is simultaneously moved to its new location near the left edge of the modified partition. The boot sector is then updated on the disk 2 to reflect the expanded partition size.

A characteristic determining step 174 is performed to determine the size and location of file system structures in the modified partition. According to one method of the present invention, which is adapted for use in resizing FAT partitions, this step 174 comprises determining the new size and location of all internal FAT file system structures in connection with the cluster resizing step 158 (FIG. 7).

The placement conventions exhibited by FAT structures in the selected partition are followed to the extent possible in view of the modified partition size. Thus, each system structure that is already within the modified partition boundaries is preferably left in the same location on the disk 2 unless that structure would not be located at the required offset within the modified partition. For instance, most but typically not all clusters within a file are left in place when cluster size is increased.

An adjusting step 176 adjusts the size, location, and contents of the file system structures as needed to reflect differences between the selected partition and the modified partition. One method for resizing FAT system structures when the cluster size is changed is described in detail in connection with FIG. 9 below. Methods for resizing file system structures are also described in the '805 application, and are incorporated herein by this reference.

An iterative approach is preferably used during the adjusting step 176. A first attempt is made to relocate all the system structures in a manner consistent with the bounds of the modified partition and the requirements of the file system in question. This first attempt may fail due to overlaps between old and new positions of the structures or due to a lack of contiguous free and good sectors in the partition large enough to receive the structures.

In the event of such failure, data and other structures on the disk 2 that can be moved are moved to provide an appropriate free location for the file system structures, after which another attempt is made to move and adjust the file system structures. The size of the disk area needed to contain all the file system structures to be relocated is determined by techniques familiar to those of skill in the art in view of the teachings herein. One or more contiguous areas inside the user data areas is then chosen and "cleared" of data by properly and safely relocating the data using techniques readily determined by those of skill in the art. Size determining, clearing, and adjusting steps are repeated as necessary to finish relocating the file system structures into the newly cleared areas. If the selected partition is being reduced then all files, directories, and other structures are moved from the truncated region to free areas within the modified partition. This is not infrequently the most time-consuming part of the manipulation.

If the selected partition is expanded, it is possible that many system structures will not need to be resized or moved. In addition, whether the partition is reduced or expanded, it will be appreciated that certain file system structures may be resized in place by techniques readily determined by those of skill in the art. Any system structures that can be left in place without compromising the integrity of the file system are preferably left in place.

An exiting step 178 follows the adjusting step 176. If the exiting step 178 follows an expansion of the selected partition, then this portion of the implementing program (a) releases any temporarily allocated disk space, and (b) returns control to the software which invoked it or forces a reboot before other processes can execute, as appropriate. If the exiting step 178 follows a reduction in partition size, all file allocation table references to data areas beyond the reduced modified partition are removed. The partition table 32 (FIG. 2) is adjusted to reflect the smaller partition size.

Regardless of whether the selected partition is reduced or expanded, the system indicator 50 (FIG. 3) is replaced during the exiting step 178. In HPFS partitions, the initial value of the system indicator 50 is restored. In FAT partitions, the initial value of the system indicator 50 is replaced by the value which corresponds to the modified partition, which need not be the same as the initial value. For instance, the system indicator 50 for a 12-bit FAT file system is replaced by the system indicator 50 for a 16-bit FAT file system less than 32 megabytes in size if the selected partition is a 12-bit FAT partition and the modified partition is a 16-bit FAT partition less than 32 megabytes in size.

Figure 2:
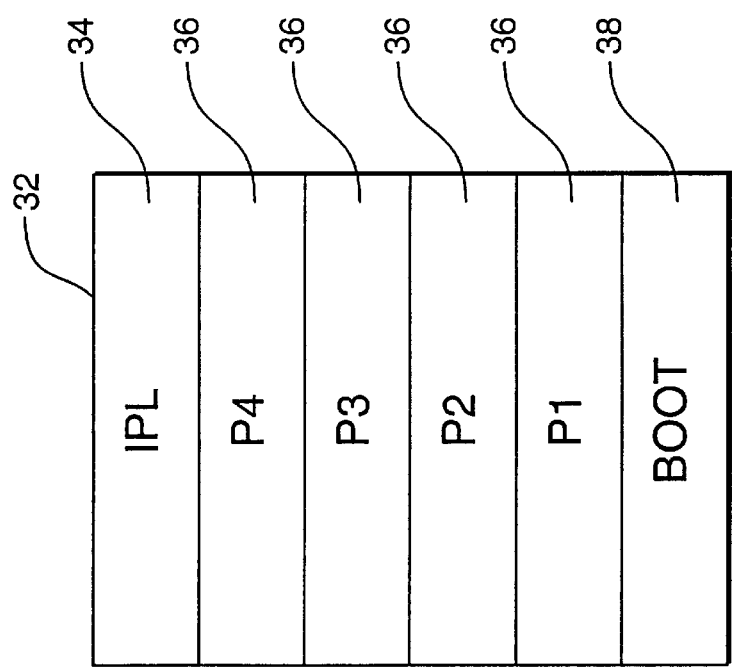
FIG. 2 is a diagram illustrating an IBM-compatible partition table.

As part of the clean-up portion of the exiting step 178 in cases where the partition is to be reduced, some methods according to the present invention check for any sectors in the truncated region of the partition which are not bad sectors and which are still allocated. If any such sectors are found, the implementing program does not alter the partition table 32 (FIG. 2). Instead, the user is informed that the selected partition could not be reduced, and control is returned to the invoking environment. This situation may occur when all or most of the free space in the selected partition would be freed by the reduction or when there are many bad sectors in the selected partition.

Cluster Resizing

Figure 9:
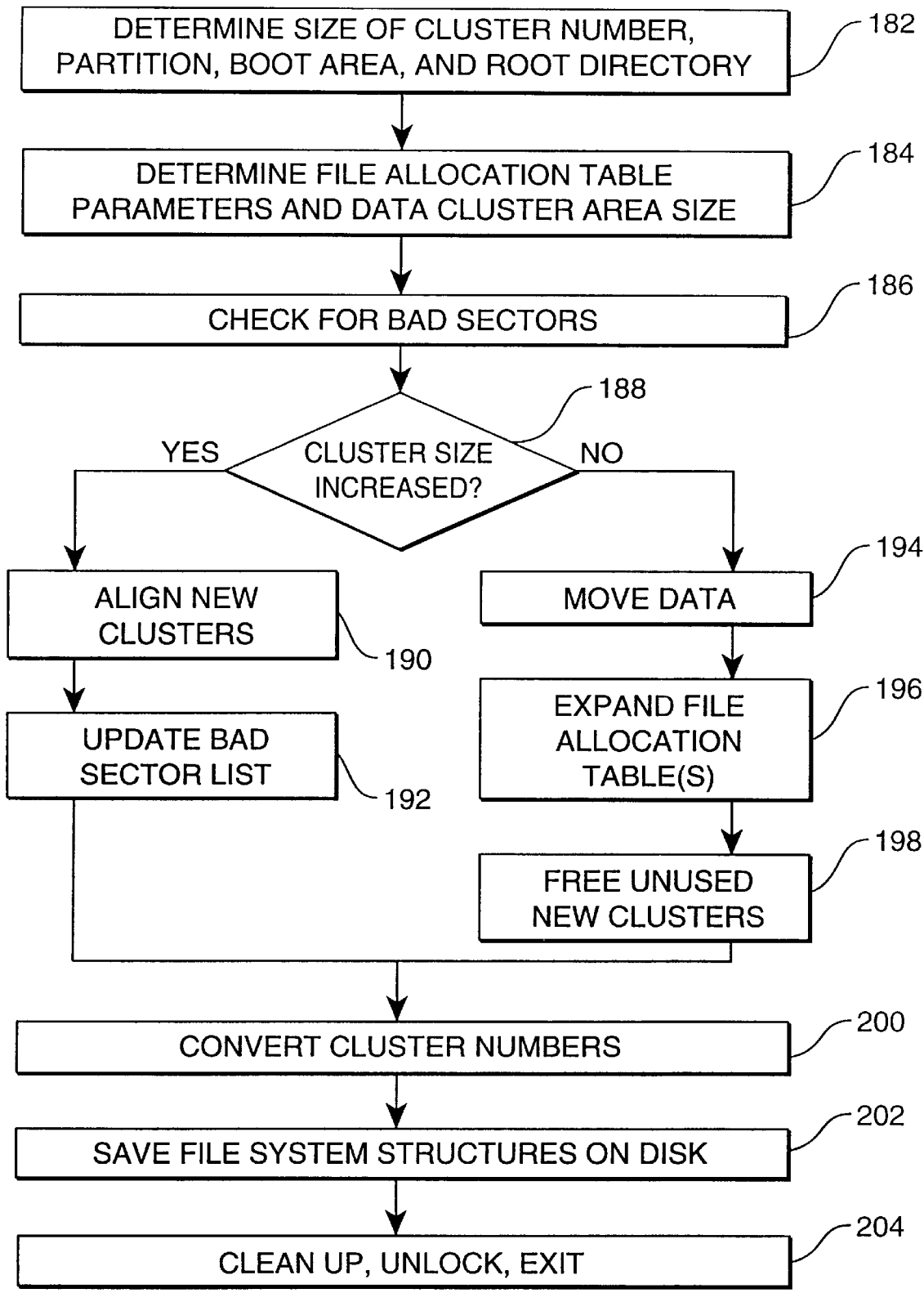
FIG. 9 is a flowchart further illustrating a cluster resizing step shown in FIG. 7 in connection with a partition employing a FAT file system.

Those of skill in the art will appreciate that one method for cluster resizing without partition resizing omits the changes to the positions of the selected partition in step 162 and the corresponding changes to the partition table 32 in step 172. FIG. 9 illustrates another method for accomplishing the cluster-resizing step 158, which may be used in the context of the partition-resizing step 154 shown in FIG. 8.

During a characteristic determining step 182, certain characteristics of the modified FAT partition are determined, including the size of the storage space occupied by each cluster number in the file allocation table (typically either 12 bits or 16 bits in current FAT file systems), the size of the modified partition, the size of the modified partition boot area, the size of the modified partition root directory. The space occupied by the file allocation table(s), boot sector(s), and root directory is the "system area." The "data cluster area" is the remaining space on the disk 2 in the modified partition outside of the system area. The data cluster area may include disk area not presently used but reserved for future growth.

The size of the system structures in a FAT partition will usually range from thirty-five sectors (assuming one boot sector, two copies of the file allocation table at one sector apiece, and a 512-entry root directory requiring thirty-two sectors) to 545 sectors (assuming one boot sector, two copies of the file allocation table at the maximum size of 256 sectors apiece, and a 512-entry root directory requiring thirty-two sectors). However, the size of the FAT system structures may be greater due to a larger root directory, a larger boot area, or the presence in the selected partition of more than two copies of the file allocation table. The implementing program may therefore require the user to always have approximately 280K plus the size of one cluster in free space on the disk 2 for the modified partition. Such a safety buffer will provide room to resize the system areas when the selected partition is resized.

To reserve disk space in a FAT file system partition when manipulating a FAT file system without help from, or knowledge of, the operating system, the present method may utilize the cluster reservation method described in the '805 application, which is incorporated herein by this reference. That cluster reservation method sets certain cluster entries to the value one rather than the value zero.

The number of data clusters in the modified partition overall and in its data area are determined during the step 182 and a subsequent parameter determining step 184. If the total number of data clusters (calculated after the size of all system structures is determined during the steps 182, 184) is greater than 4085 clusters, each cluster entry requires two bytes of space in each file allocation table. Otherwise, each cluster entry requires 1.5 bytes of space in each copy.

Typically one boot sector is reserved by FAT file systems. The present method produces a modified partition having the same number of reserved sectors as the selected partition, whatever that value may be. If any FAT system structure needs to be reduced or expanded, then the total number of sectors allocated to all file system structures must be adjusted only by an integer multiple of the cluster size. Following this rule may require padding some system structures or shrinking the reserved area or the root directory, but the size of such changes is limited to less than one cluster of disk space. This rule arises from the desire to maintain the current cluster alignment on the disk 2 (FIG. 1) and thus prevent major restructuring of all used data clusters. When padding is required to preserve cluster alignment, it is preferred that the root directory rather than the reserved boot sector area be padded. Some older FAT-specific disk utilities assume that only one boot sector is reserved; reserving additional boot sectors may cause data loss if such utilities are subsequently used.

The minimum size (in sectors) of the modified partition's root directory and the minimum desired size of that root directory are also determined during the characteristic determining step 182. The desired size must be greater than or equal to the minimum size. Most FAT partitions formatted by standard MS-DOS utilities contain 512 directory entries, filling exactly thirty-two 512-byte disk sectors.

However, under the present method the root directory may be extended beyond thirty-two sectors. Likewise, if the selected FAT partition's root directory covers more than thirty-two disk sectors and any of its end sectors are unused, it may be reduced to cover fewer sectors. The number of sectors in the root directory should be kept within bounds established by testing commonly used operating systems. For instance, the number of root directory sectors is preferably in the range from 32 to 64 sectors under the OS/2 operating system, and is preferably in the range from 32 to 96 sectors under a DOS operating system. Some users may wish to make thirty-two sectors a minimum value.

During the parameter determining step 184, the number of sectors required to hold each copy of the file allocation table is determined. Each file allocation table preferably contains exactly enough sectors to hold all cluster entries. If too few sectors are allocated, data will be lost. If too many sectors are allocated, the modified partition may be rendered unusable by OS/2 or another operating system.

One method for accomplishing the determinations made during the steps 182, 184 is set forth below in a form readily understood by those of skill in the art. All calculations should be integer truncated at each step, unless otherwise specified:

I. Determine the number of cluster entries per file allocation table sector. For a 512-byte sector, 16-bit file allocation tables hold 256 entries per sector (16BIT $CLUST_{13}$ ENTS is 256), and 12-bit file allocation tables hold 341 and 1/3 entries per sector (12BIT $CLUST_{13}$ ENTS is 341 and 1/3). Note that the first two cluster entries for every file allocation table are always used and reserved by the system.

II. Set $OLD_{13}$ $FIRST_{13}$ $DATA_{13}$ SECT to the logical sector address of the first data sector of the selected partition.

III. Set $TOTAL_{13}$ SECTS to the total number of sectors in the modified partition as determined in the characteristic determining step 182 or 174.

IV. Set $BOOT_{13}$ SECTS to the number of reserved boot sectors in the modified partition as determined in the characteristic determining step 182 or 174.

V. Set $ROOT_{13}$ SECTS to the number of root-directory sectors in the modified partition as determined in the characteristic determining step 182 or 174.

VI. Set $FAT_{13}$ SECTS to zero.

VII. Set $SECTS_{13}$ $PER_{13}$ CLUST to the selected partition's cluster size.

VIII. Set $NUM_{13}$ FATS to the number of copies of the file allocation table maintained on the disk.

IX. Follow the next loop 4 times to compute $FAT_{13}$ SECTS, $NUM_{13}$ CLUSTS, and $NEW_{13}$ $FIRST_{13}$ $DATA_{13}$ SECT. Convergence to the proper values often occurs by the end of the second iteration of the loop, but special cases require a third loop iteration to test for proper convergence, and the fourth loop iteration ensures convergence in all cases. At the end of each iteration of the loop, record the values of $FAT_{13}$ SECTS, $NUM_{13}$ CLUSTERS, and $NEW_{13}$ $FIRST_{13}$ $DATA_{13}$ SECT.

A. $NEW_{13}$ $FIRST_{13}$ $DATA_{13}$ SECT=$BOOT_{13}$ SECTS+$ROOT_{13}$ SECTS+($FAT_{13}$ SECTS×$NUM_{13}$ FATS). Align $NEW_{13}$ $FIRST_{13}$ $DATA_{13}$ SECT with the current cluster alignment as follows (this has the effect of possibly expanding the root directory):

1. If $NEW_{13}$ $FIRST_{13}$ $DATA_{13}$ SECT is greater than $OLD_{13}$ $FIRST_{13}$ $DATA_{13}$ SECT:

a) DIFF=$NEW_{13}$ $FIRST_{13}$ $DATA_{13}$ SECT−$OLD_{13}$ $FIRST_{13}$ $DATA_{13}$ SECT.

b) Add ($SECTS_{13}$ $PER_{13}$ CLUST−(remainder of (DIFF/$SECTS_{13}$ $PER_{13}$ CLUST)) to $NEW_{13}$ $FIRST_{13}$ $DATA_{13}$ SECT.

2. Else if $NEW_{13}$ $FIRST_{13}$ $DATA_{13}$ SECT is less than $OLD_{13}$ $FIRST_{13}$ $DATA_{13}$ SECT:

a) DIFF=$OLD_{13}$ $FIRST_{13}$ $DATA_{13}$ SECT−$NEW_{13}$ $FIRST_{13}$ $DATA_{13}$ SECT.

b) Add the remainder of (DIFF/$SECTS_{13}$ $PER_{13}$ CLUST) to $NEW_{13}$ $FIRST_{13}$ $DATA_{13}$ SECT.

B. $DATA_{13}$ SECTS=$TOTAL_{13}$ SECTS−$NEW_{13}$ $FIRST_{13}$ $DATA_{13}$ SECT.

C. $NUM_{13}$ CLUSTERS=$DATA_{13}$ SECTS/$SECTS_{13}$ $PER_{13}$ CLUST.

D. Determine the new value for $FAT_{13}$ SECTS. For this calculation, the number must be rounded up, since any partial sector must be allocated for the file allocation table. Do this as follows:

1. If $NUM_{13}$ CLUSTERS is greater than 4085, $FAT_{13}$ SECTS=($NUM_{13}$ CLUSTERS+2+16BIT$_{13}$ $CLUST_{13}$ ENTS−1)/16BIT$_{13}$ $CLUST_{13}$ ENTS.

2. If $NUM_{13}$ CLUSTERS is smaller than or equal to 4085, $FAT_{13}$ SECTS=($NUM_{13}$ CLUSTERS+2+12BIT$_{13}$ $CLUST_{13}$ ENTS−1)/12BIT$_{13}$ $CLUST_{13}$ ENTS.

E. Record the values for FAT_SECTS, $NUM_{13}$ CLUSTERS, and $NEW_{13}$ $FIRST_{13}$ $DATA_{13}$ SECT as stated above in connection with the initial portion of step IX.

X. When the step IX loop terminates, compare the value of $FAT_{13}$ SECTS from the fourth iteration with the value of $FAT_{13}$ SECTS from the third iteration.

A. If the values are equal, or if the fourth iteration's value is the lower of the two values, then use the fourth iteration values of $FAT_{13}$ SECTS, $NUM_{13}$ CLUSTERS, and $NEW_{13}$ $FIRST_{13}$ $DATA_{13}$ SECT;

B. Otherwise, assign these variables their respective values at the end of the third iteration of the step IX loop.

XI. $ROOT_{13}$ SECTS=$NEW_{13}$ $FIRST_{13}$ $DATA_{13}$ SECT−($BOOT_{13}$ SECTS+($FAT_{13}$ SECTS×$NUM_{13}$ FATS)). If $NUM_{13}$ CLUSTERS clusters will not hold all user data from the selected partition, notify the user and exit. Note that no file system parameter changes have yet been committed to disk. The steps described have been performed in the computer's RAM.

A checking step 186 ensures that no sectors previously identified as bad sectors lie within the proposed modified partition's system area (boot sector(s), root directory, and file allocation table(s)). If any sector having an address prior to $NEW_{13}$ $FIRST_{13}$ $DATA_{13}$ SECT within the system area of the proposed modified FAT partition has been identified as bad, either by its presence in the selected partition's bad sector list or by the presence of an error code from the disk drive 4 (FIG. 1) during the blocking step 168, then the implementing program should warn the user and exit without significantly altering the selected partition.

A selecting step 188 chooses between an increase in cluster size and a decrease in cluster size. Changes to the cluster size are constrained by Table 1, by the need to preserve file system integrity, and by the teachings of the present invention.

If cluster size is increased, it may be necessary to move clusters about on the disk 2 during an aligning step 190 to make the clusters contiguous with adjoining clusters, to achieve proper alignment, and\or to obtain sufficient free space into which the smaller clusters can safely expand. The description of methods for moving clusters provided in the '805 application is incorporated herein by reference.

During the aligning step 190, each "cluster chain" in the selected partition is adjusted to conform with four conditions. A "cluster chain" is the set of all clusters that belong to a given file or subdirectory. If N represents the modified partition cluster size divided by the selected partition cluster size, then each cluster chain is aligned to meet the following constraints:

1. Starting with the first cluster in the chain, each group of N clusters is numbered in sequential ascending order.
2. Starting with the first cluster in the chain, each group of N clusters is stored contiguously on the disk 2.
3. The start of each group of N clusters is located at an offset from the start of the data cluster area which is an exact multiple of the modified cluster size.
4. The last group of clusters in the chain may contain fewer than N clusters. However, this last group also satisfies the numbering, storage, and location requirements in constraints 1–3 above.

For example, if the selected partition cluster size is 2K and the modified partition cluster size is 4K, then pairs of 2K clusters will be combined, starting sequentially from the beginning of the file or subdirectory, to form 4K clusters until a leftover cluster or the end of the cluster chain is reached.

Any clusters in the selected partition which are currently marked "bad" due to the presence of a bad sector are also marked bad in the modified partition during an updating step 192. This is readily accomplished by those of skill in the art according to the methods disclosed herein.

If the cluster size is reduced, the new smaller clusters will already be properly aligned and generally need not be moved. However, any clusters that would be overlaid by the expanded file allocation table(s) or root directory of the modified partition are moved during a moving step 194. Movement is accomplished according to the methods described and identified herein.

During an expanding step 196, additional clusters are added to the file allocation table(s) and initialized in order to accommodate the additional clusters created in the table and in the data cluster area by dividing larger selected partition clusters into smaller modified partition clusters. The size of each file allocation table is determined during the steps 182, 184 as previously described. Cluster numbers are placed in the file allocation table according to the constraints imposed by the file system and by the present invention, with particular attention to the conversion described below in connection with a converting step 200.

Clusters which are created by the change in cluster size and which do not contain user or system data are marked as free during a freeing step 198. In many cases, the newly defined and smaller data clusters at the end of a file or subdirectory cluster chain do not hold valid data. Reducing cluster size may therefore free a significant amount of space on the disk 2. For example, a file that contains only 100 bytes of meaningful data occupies 8K when 8K clusters are used, but only occupies 1K when 1K clusters are used. When the cluster size is reduced, the other seven smaller clusters that previously formed part of the original 8K cluster can and should be freed by techniques familiar to those of skill in the art.

Regardless of whether the cluster size is reduced or increased, during a converting step 200 the original cluster numbers used in the file allocation table(s) are replaced by new cluster numbers which reflect the change in cluster size. The cluster numbers of all clusters listed in all directory structures and in the file allocation table(s) are adjusted as described below when the modified cluster size differs from the selected cluster size. Note that if the modified cluster size is less than the selected cluster size then the final cluster of some files may split into used and unused clusters, depending on the size of the data stored in that cluster, the selected cluster size, and the modified cluster size. For example, if the selected cluster size is 4K, the modified cluster size is 1K, and the final cluster holds only one byte of data, then that final cluster splits into one used 1K cluster and 3 unused 1K clusters. To deal effectively with such situations, it is presently preferred to coordinate the adjustment of file allocation table entries with the adjustment of directory entries. These adjustments are also preferably performed only in conjunction with the use of a recovery partition indicator as described above.

The following operations (shown in C-style pseudocode) will convert a sector number into a cluster number:

SECTOR−=($ROOT_{13}$ SECTS+($FAT_{13}$ SECTS*$NUM_{13}$ FATS)+$RESERVED_{13}$ SECTORS)

SECTOR/=sectors per cluster

CLUSTER=SECTOR+2

The following operations will convert a cluster number into a sector number:

CLUSTER−=2

CLUSTER*=sectors per cluster

SECTOR=CLUSTER+$ROOT_{13}$ SECTS+($FAT_{13}$ SECTS*$NUM_{13}$ FATS)+$RESERVED_{13}$ SECTORS

To convert an old (selected partition) cluster number into a new (modified partition) cluster number, first convert the old cluster number into a sector number using the method above and the parameters ($ROOT_{13}$ SECTS, $FAT_{13}$ SECTS, $NUM_{13}$ FATS, $RESERVED_{13}$ SECTORS) of the selected partition. Then convert the resulting sector number into a cluster number using the parameters of the modified partition.

In modifying the file allocation table(s), all file allocation table entries are initially inspected to identify any entries which have the value one and thus are temporarily reserved in a fixable manner as previously described; all such entries are zeroed. A buffer $NEW_{13}$ FAT large enough to hold the new file allocation table is allocated and initialized to contain all zero entries. For notational convenience, the existing file allocation table of the selected partition is denoted $OLD_{13}$ FAT.

The directory structures are traversed, and the following steps are repeated for each file and directory:

I. Let FACTOR represent the number of smaller modified clusters each selected cluster will be split into when decreasing the cluster size, or the number of smaller selected clusters that will be merged to form a single modified cluster when increasing the cluster size.

II. For each cluster ($OLD_{13}$ CLUST) before the end of the current cluster chain, do the following:
   A. Convert the old cluster number $OLD_{13}$ CLUST to a new cluster number $NEW_{13}$ CLUST using the conversion method described above.
   B. If cluster size is being reduced, repeat the following (FACTOR−1) times: $NEW_{13}$ FAT[$NEW_{13}$ CLUST]=$NEW_{13}$ CLUST+1 $NEW_{13}$ CLUST+=1
   C. If cluster size is being increased, add (FACTOR−1) to $OLD_{13}$ CLUST
   D. $OLD_{13}$ $NEXT_{13}$ CLUST=$OLD_{13}$ FAT[$OLD_{13}$ CLUST]
   E. Convert $OLD_{13}$ $NEXT_{13}$ CLUST to $NEW_{13}$ $NEXT_{13}$ CLUST using the method above
   F. $NEW_{13}$ FAT[$NEW_{13}$ CLUST]=$NEW_{13}$ $NEXT_{13}$ CLUST III. For the last cluster of the chain, do the following:
   A. Convert the old cluster number $OLD_{13}$ CLUST to a new cluster number $NEW_{13}$ CLUST using the conversion method described above.
   B. If cluster size is being reduced:
     1. If chain belongs to a file, then $BYTES_{13}$ $IN_{13}$ CLUST=$FILE_{13}$ SIZE mod (old cluster size)
     2. If chain belongs to a directory, then $BYTES_{13}$ $IN_{13}$ CRUST is determined by scanning the last cluster and counting the number of used entries
     3. $BYTES_{13}$ $IN_{13}$ CRUST+=(new cluster size−1)
     4. $USED_{13}$ CLUSTS=$BYTES_{13}$ $IN_{13}$ CRUST/(new cluster size)
     5. Repeat the following ($USED_{13}$ CLUSTS−1) times: $NEW_{13}$ FAT[$NEW_{13}$ CRUST]=$NEW_{13}$ CRUST+1 $NEW_{13}$ CRUST+=1
   C. $NEW_{13}$ FAT[$NEW_{13}$ CRUST]=−1 (end-of-chain marker)

IV. Convert the starting cluster in the directory entry to the new starting cluster.

During a preserving step 202, the system structures are then written to the disk 2. FAT file system structures to preserve include the root directory, the file allocation table (s), and the boot sector. Journaling is preferably used as described herein to protect system data from power failures.

An exiting step 204 is then performed. Certain files have internal structures which depend on cluster size, such as the OS/2 "EA DATA.SF" file, which stores file locations in cluster offsets rather than byte offsets. To complete a cluster resizing operation, the internal structure of such files is modified to reflect the modified cluster size.

Next, the boot sector is updated to reflect the size of the modified FAT partition, the size of the modified partition's file allocation table(s) and root directory, and other parameters readily determined by those of skill in the art in concert with the teachings herein.

If a recovery sector was placed on the disk 2 at the end of the modified partition, the contents of the recovery sector must then be placed appropriately in the system area of the modified partition and the partition type must be restored to the appropriate type of FAT partition. If the selected partition was expanded, the partition size was already restored. If the selected partition was reduced, appropriate changes are made at this time in the partition table 32 (FIG. 2) on the disk 2 to reflect the boundaries and size of the modified partition.

Figure 3:
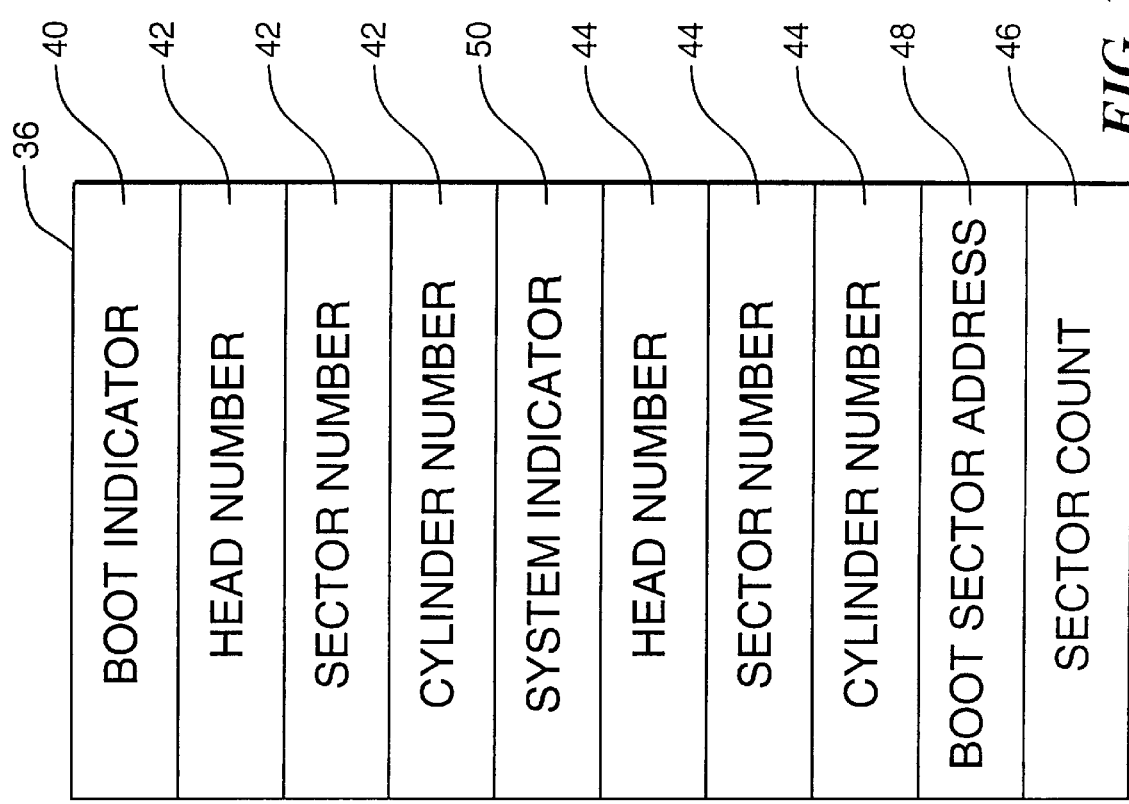
FIG. 3 is a diagram further illustrating a portion of the partition table shown in FIG. 2.

With reference to FIG. 3, the partition type indicated by the system indicator 50 in the modified partition's partition identifier 36 must reflect the recognized non-RPI type of the modified partition. If the selected partition was of a "hidden" type, the modified partition should be identified as being of a corresponding hidden type. Those of skill in the art will recognize the following as type values of FAT partitions, as indicated by the value of the system indicator 50 (other FAT-compatible file systems may use other type values):

a) Type 1 (that is, system indicator equal to 1) is a 12-bit FAT (4085 clusters or less). Type 11 hexadecimal is its hidden counterpart.
   b) Type 4 is a 16-bit FAT (4086 clusters or more) under thirty-two megabytes. Type 14 hexadecimal is its hidden counterpart.
   c) Type 6 is a 16-bit FAT greater than or equal to thirty-two megabytes. Type 16 hexadecimal is its hidden counterpart.

During the exiting step 204, the implementing program may check the FAT partition once more to ensure complete integrity. Any needed adjustments to back pointers for directories and other system structures may also be performed if those updates were skipped when moving clusters. As noted, it is also necessary to keep the partition locked until after rebooting if the operating system used on the computer does not support dynamic partition resynchronization through system calls or other means.

In summary, the present invention provides a non-destructive method that allows users who are unfamiliar with technical intricacies to easily resize and reconfigure IBM-compatible disk partitions. Knowledge of file system structures, cluster alignment, bad sector maps, partition table structure and values, and numerous other details are hidden behind a GUI and dealt with by the implementing program according to the general directions of the user. In particular, the method provides means for safely changing the cluster size in a FAT partition. Cluster resizing is advantageously combined in various ways with other partition manipulations, with integrity check, and with recovery methods.

The invention may be embodied in other specific forms without departing from its spirit or essential characteristics. The described embodiments are to be considered in all respects only as illustrative and not restrictive. In particular, the steps illustrated may be performed in a different order unless one step depends on the results of another step. The scope of the invention is, therefore, indicated by the appended claims rather than by the foregoing description. All changes which come within the meaning and range of equivalency of the claims are to be embraced within their scope.

What is claimed and desired to be secured by patent is:

1. An improved method for installing an operating system, the method combining at least the steps of choosing a computer system storage device to receive a copy of the operating system and placing a copy of the operating system in a destination partition on the chosen storage device, wherein the improvement comprises the steps of:

selecting an IBM-compatible partition located on the chosen storage device, the selected partition having two edges, the selected partition containing a file system which supports multi-sector clusters; and moving at least one edge of the selected partition without destroying user data in order to make a modified partition by relocating user data within the selected partition and shrinking the selected partition, thereby increasing the free space not claimed by any partition.

2. The method of claim 1, wherein the improvement further comprises the step of resizing clusters in the selected partition.

3. The method of claim 1, wherein the moving step comprises the steps of identifying all data clusters that will lie partially or entirely outside the modified partition, and relocating them to other cluster locations that will lie within the modified partition.

4. The method of claim 1, wherein the moving step comprises (a) determining the size of file system structures in a system area of the modified partition, (b) identifying a data area in the selected partition that will not lie within the data area of the modified partition but will instead be allocated to file system structures of the modified partition, and (c) clearing the data from the identified data area by physically relocating it to the data area of the modified partition while avoiding physical relocation of used data sectors in the selected partition that will lie within the data area of the modified partition.

5. The method of claim 1, wherein the moving step comprises moving the edge of the selected partition closest to a file system structure and adjusting the location of the file system structure as needed to maintain its integrity and internal consistency in the modified partition.

6. The method of claim 1, wherein the moving step comprises the step of storing progress markers corresponding to incrementally increasing portions of the moving step.

7. The method of claim 1, wherein the improvement further comprises the step of placing a recovery partition indicator in a partition table that defined the selected partition.

8. The method of claim 1, wherein the improvement further comprises the step of verifying the integrity and consistency of internal file system data of the selected partition.

9. The method of claim 1, wherein the moving step comprises the step of preserving at least one copy of all user data on the chosen storage device at all times during the moving step, thereby reducing the risk of loss of user data.

10. The method of claim 1, wherein the improvement further comprises the steps of creating a list of bad sectors, and avoiding the listed bad sectors while copying data and system information into the modified partition.

11. The method of claim 1, wherein the selected partition is a FAT-compatible file system partition.

12. An improved computer system combining at least a copy of an operating system to be installed, a storage device capable of receiving the operating system copy, a processor, and a memory, wherein the improvement comprises:

means for selecting an IBM-compatible partition located on the storage device, the selected partition having two edges, the selected partition containing a file system which supports multi-sector clusters; and means for moving at least one edge of the selected partition without destroying user data in order to make a modified partition by relocating user data within the selected partition and shrinking the selected partition, thereby increasing the free space not claimed by any partition.

13. The computer system of claim 12, wherein the means for selecting an IBM-compatible partition comprises a computer screen and a graphical user interface.

14. The computer system of claim 12, wherein the improvement further comprises a means for resizing clusters in the selected partition.

15. The computer system of claim 12, wherein the means for moving comprises (a) means for determining the size of file system structures in a system area of the modified partition, (b) means for identifying a data area in the selected partition that will not lie within the data area of the modified partition but will instead be allocated to file system structures of the modified partition, and (c) means for clearing the data from the identified data area by physically relocating it to the data area of the modified partition while avoiding physical relocation of used data sectors in the selected partition that will lie within the data area of the modified partition.

16. The computer system of claim 12, wherein the means for moving comprises means for moving the edge of the selected partition closest to a file system structure and means for adjusting the location of the file system structure as needed to maintain its integrity and internal consistency in the modified partition.

17. The computer system of claim 12, wherein the means for moving preserves at least one copy of all user data on the storage device at all times during the movement, thereby reducing the risk of loss of user data.

18. The computer system of claim 12, wherein the selected partition is a FAT-compatible file system partition.

19. A computer-readable storage medium having a configuration that represents data and instructions which cause a processor to perform an improved method for installing an operating system, the method combining at least the steps of choosing a computer system storage device to receive a copy of the operating system and placing a copy of the operating system in a destination partition on the chosen storage device, wherein the improvement comprises the steps of:

selecting an IBM-compatible partition located on the chosen storage device, the selected partition having two edges, the selected partition containing a file system which supports multi-sector clusters; and moving at least one edge of the selected partition without destroying user data in order to make a modified partition by relocating user data within the selected partition and shrinking the selected partition, thereby increasing the free space not claimed by any partition.

20. The storage medium of claim 19, wherein the method further comprises the step of resizing clusters in the selected partition.

21. The storage medium of claim 19, wherein the moving step comprises the steps of identifying all data clusters that will lie partially or entirely outside the modified partition, and relocating them to other cluster locations that will lie within the modified partition.

22. The storage medium of claim 19, wherein the moving step comprises (a) determining the size of file system structures in a system area of the modified partition, (b) identifying a data area in the selected partition that will not lie within the data area of the modified partition but will instead be allocated to file system structures of the modified partition, and (c) clearing the data from the identified data area by physically relocating it to the data area of the modified partition while avoiding physical relocation of used data sectors in the selected partition that will lie within the data area of the modified partition.

23. The storage medium of claim 19, wherein the moving step comprises the step of storing progress markers corresponding to incrementally increasing portions of the moving step.

24. The storage medium of claim 19, wherein the method further comprises the step of verifying the integrity and consistency of internal file system data of the selected partition.

25. The storage medium of claim 19, wherein the selected partition is a FAT-compatible file system partition.

26. The storage medium of claim 19, wherein the method further comprises the step of placing a recovery partition indicator in a partition table that defined the selected partition.

* * * * *